(12) United States Patent
MacManus

(10) Patent No.: US 7,752,003 B2
(45) Date of Patent: Jul. 6, 2010

(54) HYSTERESIS COMPENSATION IN A COORDINATE MEASUREMENT MACHINE

(75) Inventor: Richard MacManus, Narragansett, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 96 days.

(21) Appl. No.: 12/163,368

(22) Filed: Jun. 27, 2008

(65) Prior Publication Data

US 2009/0326849 A1    Dec. 31, 2009

(51) Int. Cl.
G06F 19/00 (2006.01)
G01B 5/004 (2006.01)

(52) U.S. Cl. .................................. 702/105; 33/503

(58) Field of Classification Search .................. 702/95, 702/152, 105; 33/503, 502
See application file for complete search history.

(56) References Cited

U.S. PATENT DOCUMENTS

| | | | |
|---|---|---|---|
| 4,866,643 A | 9/1989 | Dutler | |
| 4,884,889 A | 12/1989 | Beckwith, Jr. | |
| 4,939,678 A | 7/1990 | Beckwith, Jr. | |
| 5,333,386 A | 8/1994 | Bryer et al. | |
| 6,058,619 A | 5/2000 | Krebs et al. | |
| 6,178,389 B1 | 1/2001 | Sola et al. | |
| 6,513,253 B2 | 2/2003 | Matsuda et al. | |
| 6,810,597 B2 | 11/2004 | Grzesiak et al. | |
| 7,249,421 B2 * | 7/2007 | MacManus et al. | ........... 33/503 |
| 2002/0148275 A1 | 10/2002 | Abbe | |
| 2003/0106229 A1 | 6/2003 | Jordil et al. | |
| 2006/0266100 A1 | 11/2006 | McMurtry et al. | |
| 2007/0144022 A1 | 6/2007 | MacManus et al. | |

FOREIGN PATENT DOCUMENTS

| | | |
|---|---|---|
| DE | 102004007968 A | 9/2005 |
| EP | 1 376 053 A1 | 1/2004 |
| JP | 03295696 A | 12/1991 |
| WO | WO 99/13289 A1 | 3/1999 |
| WO | WO 2007/128444 A | 11/2007 |

OTHER PUBLICATIONS

Weekers, Compensation for Dynamic Errors of Coordinate Measuring Machines, Thesis [online], Jun. 27, 1996 [retrieved from the internet <URL http://alexandria.tue.nl/extra3/proefschrift/PRF12B/9602654.pdf>].

* cited by examiner

Primary Examiner—Bryan Bui
(74) Attorney, Agent, or Firm—Wolf, Greenfield & Sacks, P.C.

(57) ABSTRACT

A coordinate measuring machine compensates for hysteresis error caused by friction at the non-driven end of the bridge. The bridge may have a single drive and/or a single scale. The methods, systems, and apparatuses compensate for errors in the x-direction and/or errors in the y-direction caused by rotation of the bridge. Some embodiments compensate for hysteresis errors in the x-direction caused by a vertically-movable ram.

15 Claims, 13 Drawing Sheets

HYSTERESIS COMPENSATION IN A COORDINATE MEASUREMENT MACHINE

FIELD OF THE INVENTION

The invention relates generally to coordinate measuring machines, and more specifically to methods and apparatuses which compensate for hysteresis error when performing coordinate measuring machine measurements.

DESCRIPTION OF THE RELATED ART

Coordinate measuring machines are in common use for dimensional inspection of workpieces. Typically, a workpiece is secured to a table, and a probe, such as one using a touch sensor, is movable in three dimensions within a measurement volume to contact the workpiece at various points on the workpiece. When the probe contacts the workpiece, measuring scales in the x, y and z directions are read to obtain the position coordinates of the contacted point on the workpiece. By contacting various points on the workpiece, measurements of workpiece features, such as lengths of workpiece features, can be obtained.

In a gantry-type coordinate measuring machine, vertical legs support two parallel, horizontal guideways, which in turn support a bridge over the table. The bridge is movable horizontally and supports a carriage that moves in a horizontal direction perpendicular to the bridge movement. For vertical probe movement, a vertically-movable ram typically is attached to the carriage. In many conventional gantry-type coordinate measuring machines, each of the bridge-supporting guideways includes both a drive motor, for moving the bridge, and a scale, from which readings of the bridge position are obtained.

The accuracy of a coordinate measuring machine is limited in part by inaccuracies in the scales and the guideways. Conventional coordinate measuring machines have three orthogonal directions of movement which establish probe positioning. Each direction of movement has one or more guideways, and ideally, movement along these guideways is perfectly linear and the scale readings correspond directly to the probe's position. Of course, every guideway has some degree of non-linearity and twist, and these imperfections lead to some amount of static error in determining a probe's position with the scale readings. Various techniques for reducing static guideway errors and/or compensating for such errors are known in the art. For example, precision machine design can be used to physically limit errors caused by non-linearity and twist. Further accuracy improvements can be accomplished by compensating for static errors that do occur.

One example of a technique for compensating for the static errors associated with the non-linearity and/or twist of guideways is the use of a calibration system to obtain error parameters at a number of probe positions throughout the measurement volume. For example, a calibration system may be used to measure the three linear errors and the three rotational errors for each direction (x, y and z) at each of the calibrated probe positions. The error parameter data at each position then may be used to estimate the static error at any point in the measurement volume. Such a technique is described in U.S. Pat. No. 4,884,889 to Beckwith et al.

In addition to static errors, friction in the guideways can lead to hysteresis error in a coordinate measuring machine. Bearings, bellows and wipers are all examples of elements that can cause friction in the guideways when components of the machine are being moved.

Additional errors can be caused by factors associated with the movement of components during coordinate measuring machine operation. For example, the non-uniform angular velocity of a motor caused by motor cogging can produce shimmying in coordinate measuring machine components. Motor cogging typically exhibits a sinusoidal pattern, and depending on a number of factors, the resultant component position errors caused by motor cogging may also exhibit a sinusoidal pattern, or a periodic pattern of some sort. Acceleration and deceleration of machine components such as the bridge, carriage or vertical ram can also lead to positional errors due to inertial forces. Another potential source of error during movement is the entry of a ball into the track of a re-circulating ball bearing.

While significant advances in coordinate measuring machine techniques have resulted in highly accurate coordinate measuring machines, further improvements to the accuracy of determining a probe's position in a coordinate measuring machine are desirable.

BRIEF SUMMARY OF THE INVENTION

Embodiments of the present invention are directed to methods, apparatuses, systems and software/firmware that compensate for hysteresis error in a coordinate measuring machine. Examples of some embodiments are described in U.S. Pat. No. 7,249,421, issued on Jul. 31, 2007, which is hereby incorporated by reference in its entirety.

One aspect of the invention relates to a method of measuring the length of a workpiece feature with a coordinate measuring machine. The coordinate measuring machine includes a table, first and second guideways associated with the table, a bridge movable in a y-direction, a drive element associated with the first guideway for driving the bridge, a carriage movable on the bridge in an x-direction, a probe mounted to the carriage, and a first scale operative to permit scale readings indicating x-direction positions of the carriage along the bridge. The method includes acts of: (A) obtaining hysteresis error data for the bridge; (B) moving the bridge in a first direction, moving the carriage in a second direction, and, at a first bridge position and a first carriage x-direction position, taking a first reading from the first scale; and (C) moving the bridge in a third direction opposite to the first direction, moving the carriage in a fourth direction, and, at a second bridge position and a second carriage x-direction position, taking a second reading from the first scale. The method also includes (D) determining a value of the length of the workpiece feature based on at least: the first reading from the first scale; the second reading from the first scale; the first direction of movement of the bridge; and the hysteresis error data.

Another aspect of the invention relates to a computer system for determining a value for the length of a workpiece feature of a workpiece disposed on a coordinate measuring machine, based on data from the coordinate measuring machine; the coordinate measuring machine comprising a table, first and second guideways, a bridge movable on the guideways, a drive element associated with the first guideway for driving the bridge, a carriage movable on the bridge, a probe mounted to the carriage, and a scale operative to permit scale readings indicating a position of the carriage along the bridge. The computer system includes: a first input to receive a first scale reading of a first position of the carriage with the bridge at a first bridge position and with the probe at a first distance from a reference that is parallel to the bridge, and a second input to receive a value of the first distance of the probe from the reference. The computer system further includes a third input to receive an indication of a first direction of movement in which the bridge moved to move to the first bridge position. Also included in the computer system is a fourth input to receive a second scale reading of a second position of the carriage with the bridge at a second bridge position and with the probe at a second distance from the reference, the second position of the bridge differing from the first position of the bridge, a fifth input to receive a value of the second distance of the probe from the reference, and a sixth input to receive an indication of a second direction of movement in which the bridge moved to move to the second bridge position of the bridge. The computer system also includes a seventh input to receive hysteresis error data, and a set of instructions configured to determine a value for the measurement of the workpiece feature based on at least the information received by the first, second, third, fourth, fifth, sixth and seventh inputs.

In another aspect of the invention, there is provided a computer storage medium having instructions stored thereon that, as a result of being executed by a computer, instruct the computer to perform a method of determining a value for the length of a workpiece feature using data from a coordinate measuring machine, the coordinate measuring machine comprising a table, first and second guideways, a bridge movable on the guideways, a drive element associated with the first guideway for driving the bridge, a carriage movable on the bridge, a probe mounted to the carriage, and a scale operative to permit scale readings indicating a position of the carriage along the bridge. The method includes receiving a first scale reading of a first position of the carriage with the bridge at a first bridge position and the probe at a first distance from a reference, receiving an indication of a first direction of movement in which the bridge moved to move to the first bridge position, and receiving a value of the first distance of the probe from the reference. The method also includes receiving a second scale reading of a second position of the carriage with the bridge at a second bridge position different from the first bridge position, receiving a value of the second distance of the probe from the reference, and receiving hysteresis error data associated with errors in a direction parallel to movement of the carriage on the bridge. Further, the method includes determining a value for a measurement of the workpiece disposed on the coordinate measuring machine based on at least: the first scale reading; the indication of the first direction of movement of the bridge; the value of the first distance of the probe from the reference; the second scale reading; the value of the second distance of the probe from the reference; and the hysteresis error data.

According to another aspect of the invention, there is provided a method of measuring the length a workpiece feature with a coordinate measuring machine, the coordinate measuring machine comprising a carriage movable in an x-direction; a first scale operative to permit scale readings indicating x-direction positions of the carriage, a ram mounted to the carriage and configured to move in a z-direction, a drive element configured to drive the ram, and a probe mounted to the ram. The method includes: (A) obtaining hysteresis error data for the ram; (B) moving the ram in a first direction and the carriage in a second direction to a first ram position and a first carriage x-direction position, and taking a first reading from the first scale; and (C) moving the ram in a third direction opposite to the first direction and the carriage in a fourth direction to a second ram position and a second carriage x-direction position, taking a second reading from the first scale. The method further includes (D) determining a value of the length of the workpiece feature based on at least: the first reading from the first scale; the second reading from the first scale; the first direction; and the hysteresis error data.

In another aspect of the invention, there is provided a computer storage medium having instructions stored thereon that, as a result of being executed by a computer, instruct the computer to perform a method of determining a value for the length of a workpiece feature using data from a coordinate measuring machine, the coordinate measuring machine comprising a table, first and second guideways, a bridge movable on the guideways, a drive element associated with the first guideway for driving the bridge, a carriage movable on the bridge, a ram mounted to the carriage and configured to move in a z-direction, a drive element configured to drive the ram, a probe mounted to the ram, and a scale operative to permit scale readings indicating a position of the carriage along the bridge. The method includes receiving a first scale reading of a first position of the carriage with the ram at a first ram position and the probe at a first z-direction distance from a reference, receiving an indication of a first direction of movement in which the ram moved to move to the first ram position, and receiving a value of the first distance of the probe from the reference. The method also includes receiving a second scale reading of a second position of the carriage, different from the first carriage position, with the ram at a second ram position different from the first ram position, receiving a value of the second distance of the probe from the reference, and receiving hysteresis error data associated with errors in a direction parallel to movement of the carriage on the bridge. Further, the method includes determining a value for a measurement of the workpiece disposed on the coordinate measuring machine based on at least: the first scale reading; the indication of the first direction of movement of the ram; the value of the first z-direction distance of the probe from the reference; the second scale reading; the value of the second z-direction distance of the probe from the reference; and the hysteresis error data.

In a further aspect of the invention, there is provided a computer storage medium having instructions stored thereon that, as a result of being executed by a computer, instruct the computer to perform a method of determining a value for the length of a workpiece feature using data from a coordinate measuring machine, the coordinate measuring machine comprising a table, first and second guideways, a bridge movable on the guideways, a drive element associated with the first guideway for driving the bridge, a carriage movable on the bridge, a ram mounted to the carriage and configured to move in a z-direction, a drive element configured to drive the ram, a probe mounted to the ram, and a scale operative to permit scale readings indicating a position of the carriage along the bridge. The method includes receiving a first scale reading of a first position of the carriage with the ram at a first ram position and the probe at a first z-direction distance from a reference, receiving an indication of a first direction of movement in which the ram moved to move to the first ram position, and receiving a value of the first z-direction distance of the probe from the reference. The method also includes receiving a second scale reading of a second position of the carriage, different from the first carriage position, with the ram at a second ram position different from the first ram position, receiving a value of the second distance of the probe from the reference, and receiving hysteresis error data associated with errors in a direction parallel to movement of the carriage on the bridge. Further, the method includes determining a value for a measurement of the workpiece disposed on the coordinate measuring machine based on at least: the first scale reading; the indication of the first direction of movement of the ram; the value of the first z-direction distance of the probe from the reference; the second scale reading; the value of the second z-direction distance of the probe from the reference; and the hysteresis error data.

DETAILED DESCRIPTION OF THE INVENTION

Figure 1:
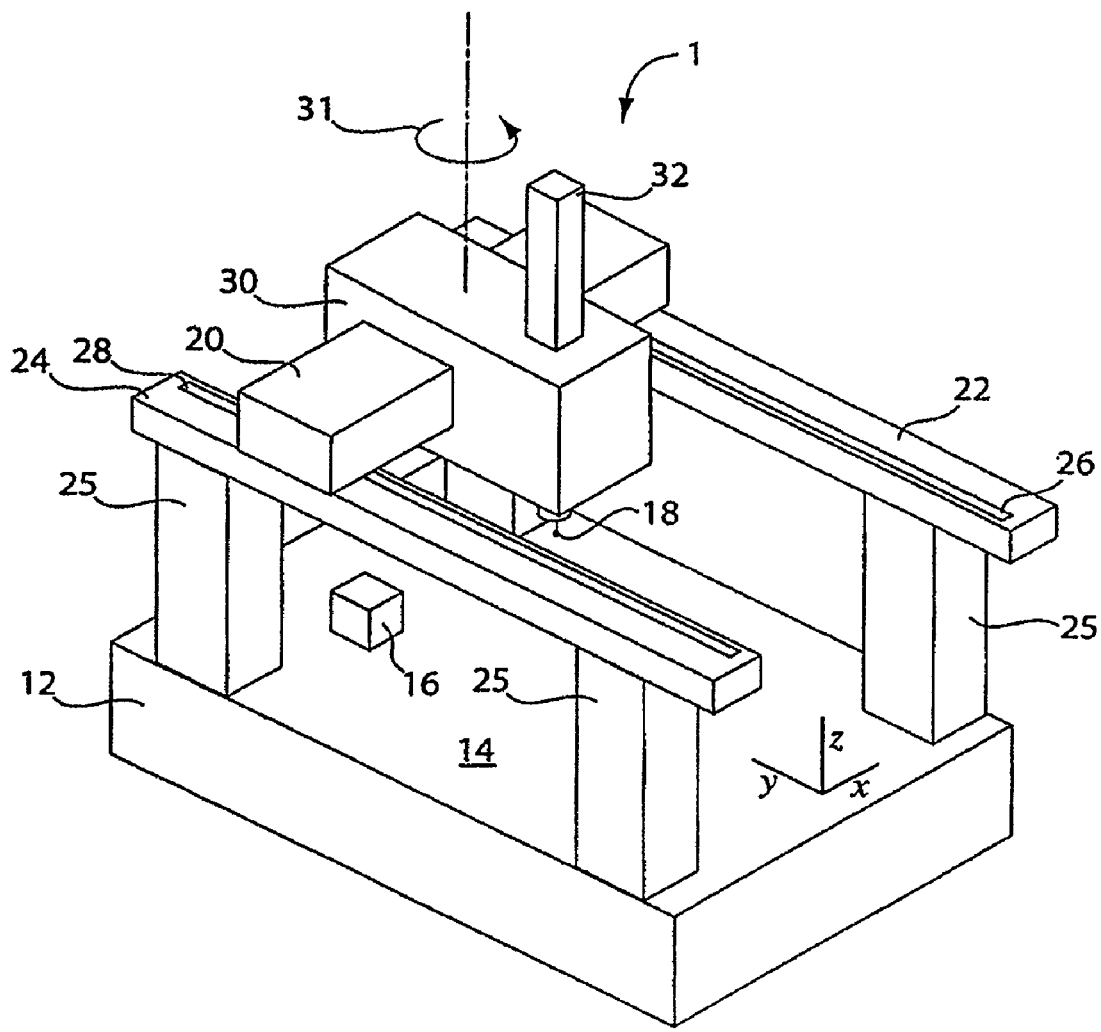
FIG. 1 is a perspective view of a prior art gantry-type coordinate measuring machine.

A conventional gantry-type coordinate measuring machine 10 is illustrated in FIG. 1. Coordinate measuring machine 1 includes a base 12, a table 14 to which a workpiece 16 is secured, and a probe 18 for sensing and signaling contact with the workpiece. Probe 18 is movable throughout a measurement volume along three orthogonal axes x, y and z. For movement along the y-axis, a bridge 20 is movably supported by two guideways—a right guideway 22 and a left guideway 24. Guideways 22, 24 are supported on base 12 by legs 25. The vertical legs may be integral or non-integral with the guideways, table and/or base. Each of right and left guideways 22, 24, includes a scale 26, 28 from which readings are taken to establish the position of the corresponding end of the bridge. Bridge 20 supports a carriage 30 which moves in a horizontal direction along the x-axis, which is perpendicular to the bridge movement. Mounted to carriage 30 is a vertically-movable ram 32 which moves along the z-axis and carries probe 18. It should be noted that the terms "mounted to" and "mounted on", for purposes herein, do not require an element to be directly mounted to another element. For example, a probe which is carried on a vertical ram which in turn is mounted to a carriage is considered to be a probe mounted to the carriage. Additionally, the terms "mounted to" and "mounted on" do not require an element to be fixedly mounted to another element. One element may be movably, slidably, or pivotably mounted to another element, for instance with bearings, rails or slideways (not shown). Typically, the various elements of a coordinate measuring machine are movably mounted to other elements. A "workpiece", for purposes herein, is any object placed within the measurement volume of the coordinate measuring machine such that it may be measured.

Ideally, a perfectly aligned bridge would result in scale readings that provide the exact position of each point along the bridge and thus a nearly exact position of probe 18 along the y-axis, allowing for the fact that the trueness of carriage 30 and vertical ram 32 also affect the probe's y-axis position relative to its scale readings. Of course, in most coordinate measuring machines, the bridge is not perfectly aligned and rigid, which causes various static errors within the system. As described above, various techniques exist for reducing these static errors through machine design and compensation for static errors using calibration.

Another source of error may cause rotation of the bridge about a vertical axis, and this error source is not taken into account by prior art calibration techniques. In the bridge of a coordinate measuring machine having a bridge drive element at only one end of the bridge, friction at the non-driven end of the bridge may cause the non-driven end to lag slightly behind the driven end. This friction rotates the bridge about a vertical axis such that yaw error exists in the bridge. The yaw error affects the actual y-axis position of the probe as compared to the measured y-axis position because the perpendicularity of the bridge to the bridge scale is affected. For example, if bridge 20 of FIG. 2 were to be driven only on the right side, and it was moving in the direction of arrow A, the left side of the bridge would lag behind the right side. When attempting to measure the y-axis position of a point C on carriage 30, the reading from right scale 26 would be too high, and the reading from left scale 28 would be too low. The direction of rotation of bridge 20 about a z-axis is also shown with rotation arrow 31 in FIG. 1, although the actual rotation axis may be positioned elsewhere.

Typically, the net effect of the yaw error depends on the distance of the measurement point from the bridge scale. For example, when the carriage is close to the bridge scale when a scale reading is taken, the yaw error of the bridge has a lesser effect on the y-axis measurement as compared to a situation in which the carriage is farther from the scale. These friction-induced effects are often referred to as hysteresis, and the resulting measurement error is often referred to as hysteresis error.

Hysteresis error is not restricted to yaw error as it can encompass roll error and pitch error, as well as displacement errors. For example, some bridge-type coordinate measuring machines have bridge guideways at different vertical heights. With a drive system on only one guideway, friction at the opposite guideway tends to cause a rotation that is not wholly about a vertical axis. Instead, the friction can additionally cause a slight rotation about a horizontal axis that is perpendicular to the bridge guideways, which leads to pitch error.

Unlike static error, hysteresis error is not predominantly position dependent. Instead, hysteresis error also depends on direction of movement. For example, the non-driven end of the bridge may lag behind the driven end by a certain offset, and the direction of movement of the bridge determines the direction of this offset. When the bridge moves in the positive y-direction, the non-driven end of the bridge may have a lower y-coordinate value than the driven end. Conversely, when the bridge moves in the negative y-direction, the non-driven end of the bridge may have a higher y-coordinate value than the driven end. When the bridge reverses direction, for example from the positive y-direction to the negative y-direction, the non-driven end of the bridge has not reached the y-direction extreme of the driven end at the point of reversal. While returning in the negative y-direction, the driven end passes the non-driven end in the y-direction before the non-driven end begins travel in the same direction. This occurrence is referred to as "lost motion". Because hysteresis error is direction dependent, error compensation techniques that do not at least indirectly take direction of movement into account do not address hysteresis error.

For purposes herein, a reference to an element being movable in an x-direction (or y-direction or z-direction) means that the element is movable in both the positive x-direction and the negative x-directions (or positive and negative y-directions or z-directions). For purposes herein, references to an element being moved in a first direction means that the element was moved in one of a positive direction or a negative direction.

Figure 2:
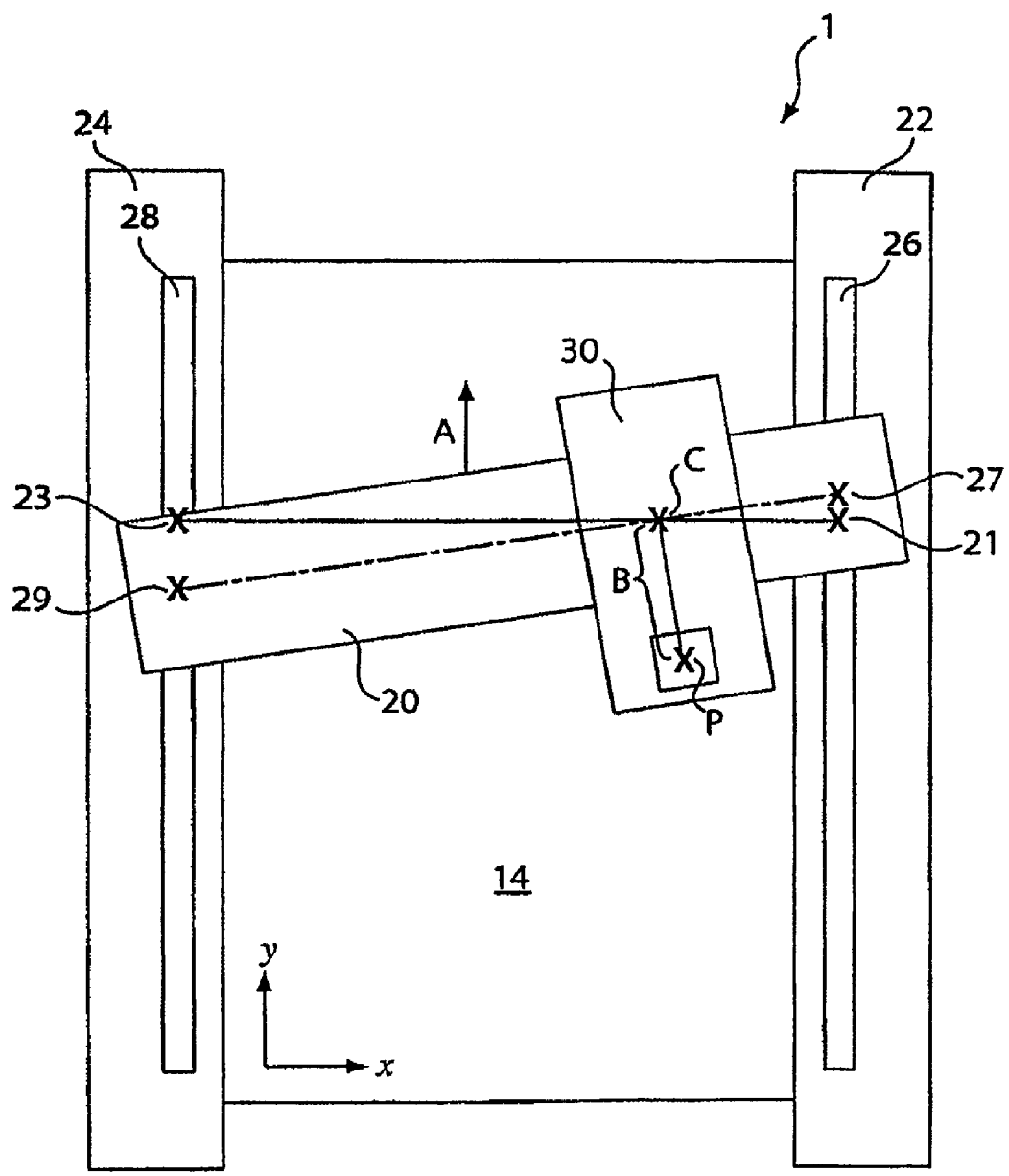
FIG. 2 is a schematic top plan view of the coordinate measuring machine of FIG. 1 showing the use of two scales to determine probe positioning along the y-axis.

Typical gantry-type coordinate measuring machines, such as the one shown schematically in FIG. 2, have dual-scale and dual-drive systems for the bridge, that is, a drive element and a scale are provided at both ends of the bridge. With dual-scale and dual-drive systems, the effect of hysteresis error on the y-axis measurement is negligible. Firstly, having a drive element at each end of the bridge substantially reduces any friction-induced lag. Secondly, even if the bridge does rotate due to dynamic effects, the dual-scale system compensates for the resulting y-axis measurement errors as described below.

An exaggerated rotation of a bridge 20 is shown in FIG. 2 for illustrative purposes. In FIG. 2, bridge 20 is moving in the direction of arrow A on a coordinate measuring machine 1. Ideally, when measuring the position of a point C on bridge 20, the y-axis readings taken from each of the two scales 26, 28 would be the same as the y-axis position of point C, that is, the readings on scales 26, 28 would be at points 21 and 23 respectively. Because of yaw error, however, the y-axis readings taken by scales 26, 28 are at points 27 and 29. The reading at point 27 is too high, and the reading at point 29 is too low. With a dual-scale system, to determine the position of point C (and hence probe position P by adding distance B) along the y-axis, a y-axis position reading is taken from a scale at each end of bridge 20, and a measurement value is determined using well-known interpolation techniques based on the x-axis position of the probe. This dual-scale interpolation compensates for y-axis measurement error caused by the yaw (rotation about a z-axis) of the bridge. More particularly, to obtain an estimate as to the y-axis position of a point C on bridge 20, the scale readings from each scale are interpolated. From point C, the y-axis position of probe position P can be calculated.

Typically, it is assumed for the interpolation that bridge 20 is perfectly linear, and therefore a linear relationship exists between the x-axis position of the target point and the interpolated y-axis position of bridge 20 at the target point. In other words, it is assumed that bridge 20 (or other coordinate measuring machine component) is adequately rigid to resist bending along it length, and any moment applied to bridge 20 results only in rotation rather than bending. This assumption is reasonable when dealing with the magnitude of forces produced by typical levels of friction in coordinate measuring machines. For example, if carriage 30 (at point C) is at an x-axis position that is three-quarters of the x-axis distance from point 29 to point 27, it is assumed that point C is at a y-axis position that is three-quarters of the y-axis distance between point 29 and point 27.

A single-scale, single-drive bridge may be used in a coordinate measurement machine to reduce the cost and the amount of inspection and maintenance as compared to dual-scale, dual-drive bridges. However, the lack of a dual-scale system exposes the coordinate measuring machine to potential hysteresis errors. These errors can be reduced by the use of air bearings for movably supporting the bridge on the guideways, because air bearings produce only an insignificant amount of friction. While air bearings have the advantage of low friction, they are not always well-suited to the environments in which some coordinate measuring machines are used. For example, in some non-environmentally controlled shop environments, air bearings may become contaminated by oily dirt or other contaminants, which can affect the bearing performance and/or require regular inspection, cleaning, maintenance and repair. In such environments, mechanical bearings or contact bearings, such as linear ball bearings, may be desirable.

Compensation for y-Component Errors Caused by Bridge Yaw Rotation

Mechanical bearings and their associated elements create friction, which, in a single drive system, can create unacceptable hysteresis error. Instead of using two scales and interpolating the readings, according to one aspect of the invention, to compensate for the effects of hysteresis on measurement results in a single-scale system, a calibration block is used to calibrate the system by obtaining hysteresis error data, and this hysteresis error data is used in determining values for measurements of features of a workpiece. In some embodiments, to measure a y-direction distance on a workpiece, a y-axis reading is taken with a single scale, and then a hysteresis compensation factor (based on previously obtained hysteresis error data) is added to the scale reading to compensate for the effect of the rotation of the bridge on the scale reading. The distance of the carriage from the scale is typically used in conjunction with the hysteresis error data to determine the hysteresis compensation factor.

For example, in one embodiment of the invention, a calibration block is secured to the coordinate measuring machine table such that it is parallel to the y-axis. The calibration block is placed at the far side (in the x-direction) of the table relative to the bridge scale because this location incurs the largest effect from the hysteresis. The two ends of the calibration block are contacted by the probe with the probe traveling in opposite directions for contact with each end. Scale readings are taken when the probe signals contact with each end of the calibration block, and from these readings, a value is calculated for the length of the block. This value is then compared to the known length of the calibration block to arrive at an estimate of hysteresis error (in the y-direction) present at this particular distance (in the x-direction) from the scale.

When the length (in the y-direction) of a workpiece is then measured using the coordinate measuring machine, the measurement length is adjusted by a fraction of the hysteresis error previously calculated with the calibration block. Using a relationship of the y-direction error to the x-position of the carriage, this fraction is determined based on a comparison of the x-direction position of the carriage (when measuring the workpiece) to the x-direction position of the calibration block. When contending with the relatively low force magnitudes typically caused by friction, the relationship between the y-direction error and the x-position of the carriage is assumed to be linear. Using this assumption of a linear relationship, the ratio of the applied error adjustment to the calculated calibration block error is the ratio of the distances from the scale (in the x-direction) of the workpiece and the calibration block. Of course, a relationship other than a linear relationship may be used to determine an error adjustment.

Variations to this method, including fewer, additional, and/or different acts are intended to fall within the scope of the invention, and further embodiments are described below. The order of acts as presented in the specification and figures may be varied and still be considered to fall within the scope of the invention. Further, the various embodiments of the invention are not restricted to specific types of probes. In some embodiments, the probe may be a mechanical contact probe such as a touch trigger probe, and in other embodiments, the probe may be an optical sensor, a capacitance sensor, an air flow sensor or any other suitable sensor.

Figure 3:
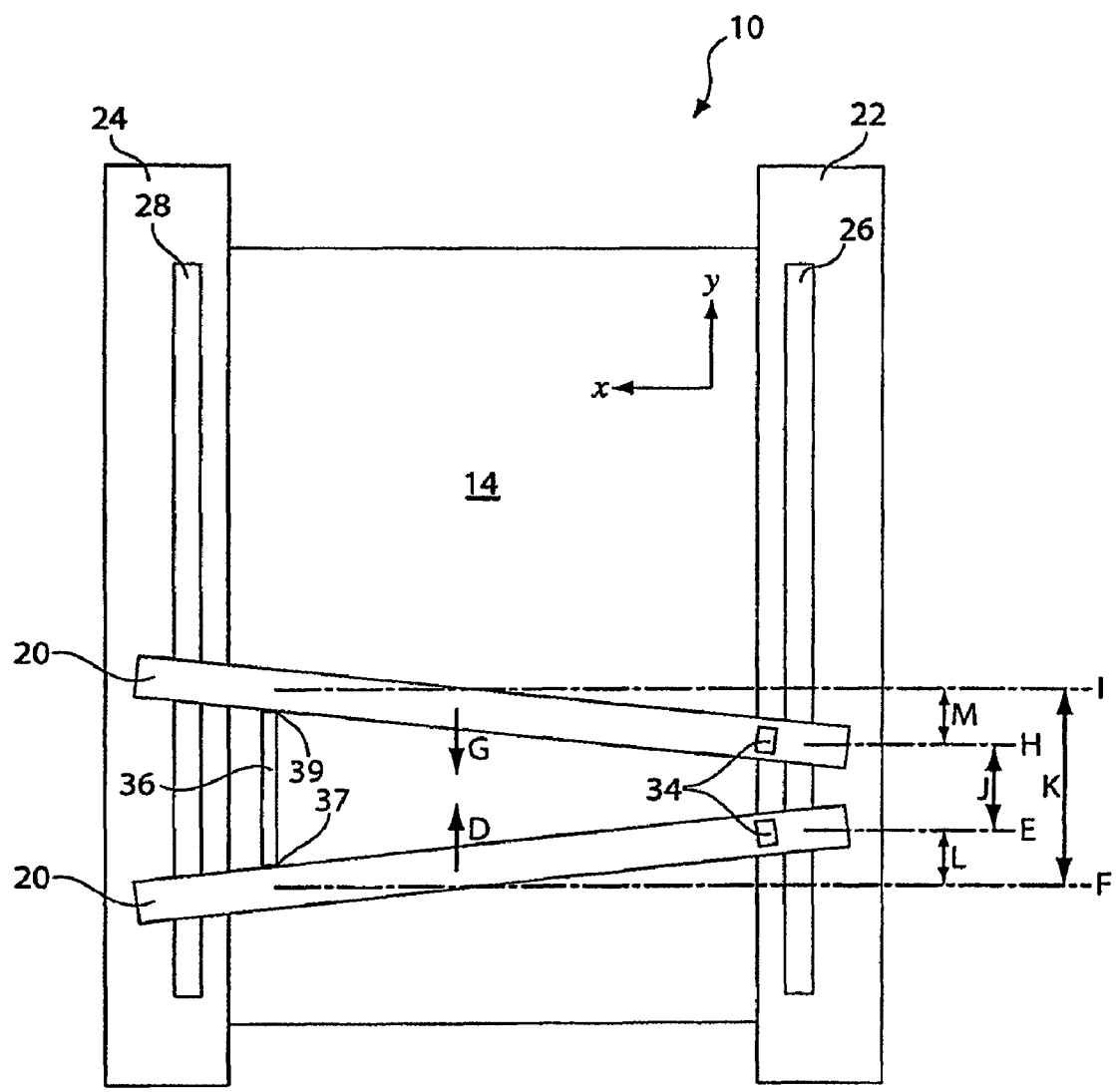
FIG. 3 is a schematic top plan view illustrating a gantry-type coordinate measuring machine which has a single scale for the bridge, with the probe being shown in two different positions during the measurement of a block.

In the schematic illustration of FIG. 3, bridge 20 is shown in two different positions on a coordinate measuring machine 10. Bridge 20 has only one drive element 34 and one bridge scale 26, both of which are on the right side of the coordinate measuring machine in the view of FIG. 3. In a first position, bridge 20 has moved in a positive y-direction (arrow D) until the probe (not shown) contacted a calibration block 36 at a first end 37. An exaggerated hysteresis effect is illustrated in FIG. 3 to show how the reading on scale 26 (leader line E) will have a higher y-value than the actual y-value of the probe position (leader line F) when the probe contacts calibration block 36.

When bridge 20 approaches calibration block 36 from the opposite direction, i.e., when bridge 20 is moving in a negative y-direction (arrow G), and the probe contacts a second end 39 of the calibration block, the lag of the bridge is in the opposite direction when compared to the bridge's first position, as can be seen in FIG. 3. In this second position, the reading on scale 26 (leader line H) will have a lower y-value than the actual y-value of the probe position (leader line I) when the probe contacts calibration block 36.

Based on these measurements, the coordinate measuring machine calculates a block length J, while the actual, known calibration block length is length K. The difference (length L+length M) is the estimated hysteresis error for measurement at this particular x-direction distance from scale 26. A ratio of the estimated hysteresis error can then be used as a compensation factor when measuring a workpiece. For example, if the hysteresis error (length L+length M) is found to be 9 microns at the full distance from right scale 26, a measurement of a workpiece that is two-thirds of the distance from right scale 26 could be adjusted by 6 microns. Looking at FIG. 7 as an example, if a workpiece 16 is two-thirds of the distance from scale 26 as compared to the calibration block, and the hysteresis error at the calibration distance was found to be 9 microns, a hysteresis compensation factor of 6 microns would be added to the length of workpiece 16 that is determined by the readings on scale 26.

In some embodiments, calibration may be performed using a number of calibration blocks arranged linearly, such as by using a step gauge. After measuring a number of calibration blocks, an average of the estimated hysteresis error may be calculated. By measuring numerous calibration blocks, other dynamic errors, such as motor cogging errors and/or acceleration/deceleration errors, may be averaged. Motor cogging errors often exhibit a sinusoidal pattern over a distance of bridge travel, and the measurement of any a single calibration block might result in taking calibration scale readings when the motor cogging effect is at or near an extreme. Estimating the hysteresis error based on a measurement that includes a significant motor cogging error could result in an overestimation or an underestimation of the hysteresis error depending on the direction of motor cogging error at the moment of taking a scale reading. By calibrating with a number of calibration blocks, an average motor cogging error (which may in certain instances be at or near zero) is incorporated into the hysteresis error estimate.

Figure 4:
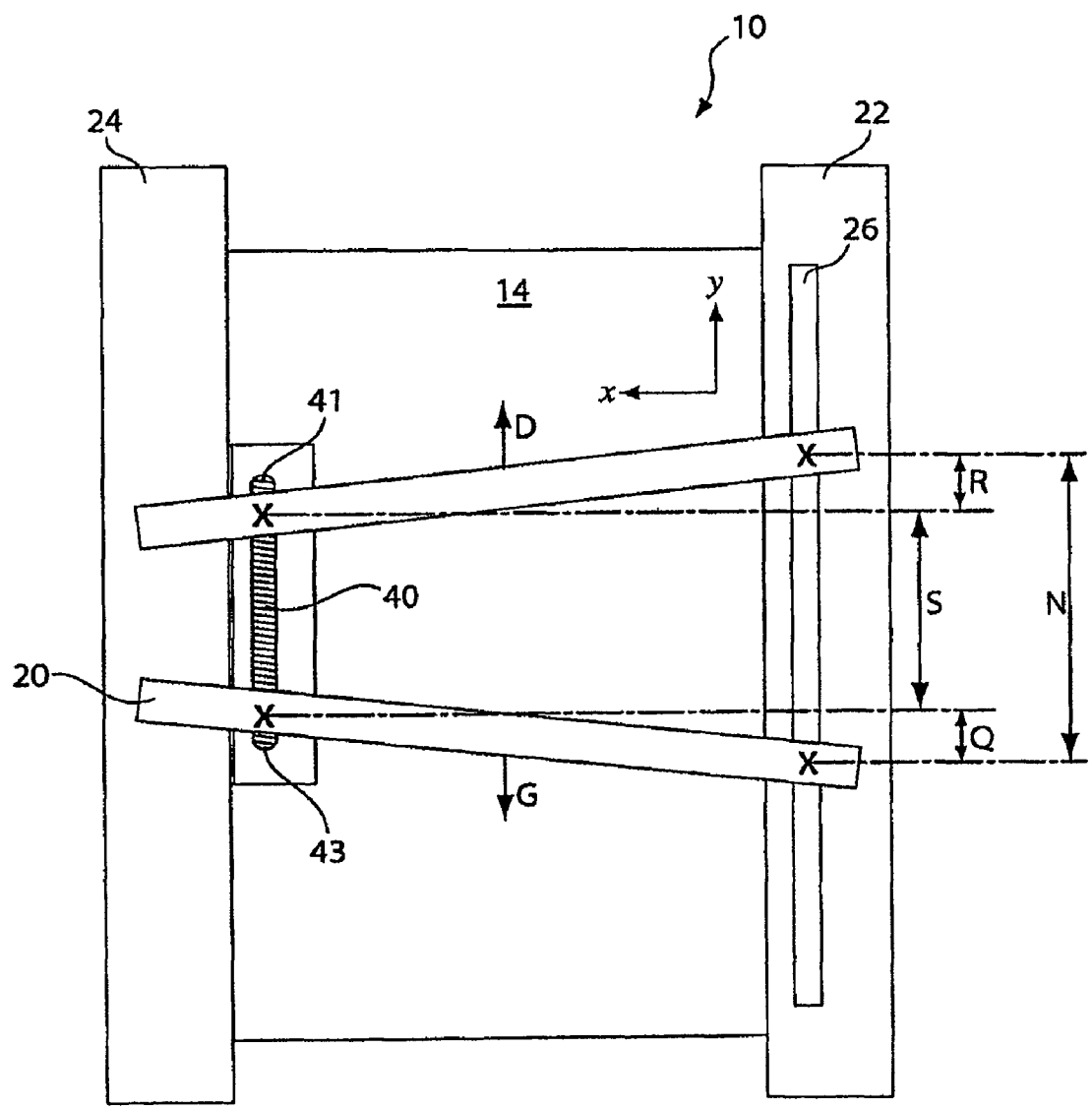
FIG. 4 is a schematic top plan view of the gantry-type coordinate measuring machine illustrated in FIG. 3, with the probe being shown in two different positions to measure a slot.

Instead of a calibration block, a calibration slot may be used to obtain hysteresis error data. For example, as shown schematically in FIG. 4, a calibration piece including a slot 40 is secured parallel to scale 26. Bridge 20 is moved in a positive y-direction (arrow D) until contact is made by the probe (not shown) at a first end 41 of slot 40. Upon probe contact, a scale reading indicates a higher y-coordinate value than the actual y-coordinate position of the first end of slot 40. Bridge 20 is then moved to a second end 43 of slot 40 by moving in the negative y-direction (arrow G). Upon probe contact, the scale reading for bridge 20 indicates a lower y-coordinate value than the actual y-coordinate position of the second end 43 of slot 40. Using the two scale readings, the coordinate measuring machine calculates a slot length N, whereas the actual, known length is length S. The difference (length Q+length R) is the estimated hysteresis error for measurement at this particular x-direction distance from scale 26.

The hysteresis error data, whether obtained as described above or obtained in a different manner, may be used as part of the determination of dimensions of workpiece features. While calibration to determine hysteresis error data can be performed before each use of the coordinate measuring machine, typically calibration is performed prior to the machine's first use and then at certain intervals based on machine usage time or changes in operating conditions. When calibration is performed, the hysteresis error data may be saved within a memory module, within a software module, as part of firmware, or in any other suitable manner. In some embodiments, calibration may be performed on a plurality of machines, and a resulting average (or other statistic) of hysteresis error or bridge rotation may be used as hysteresis data for additional coordinate measuring machines.

Figure 5:
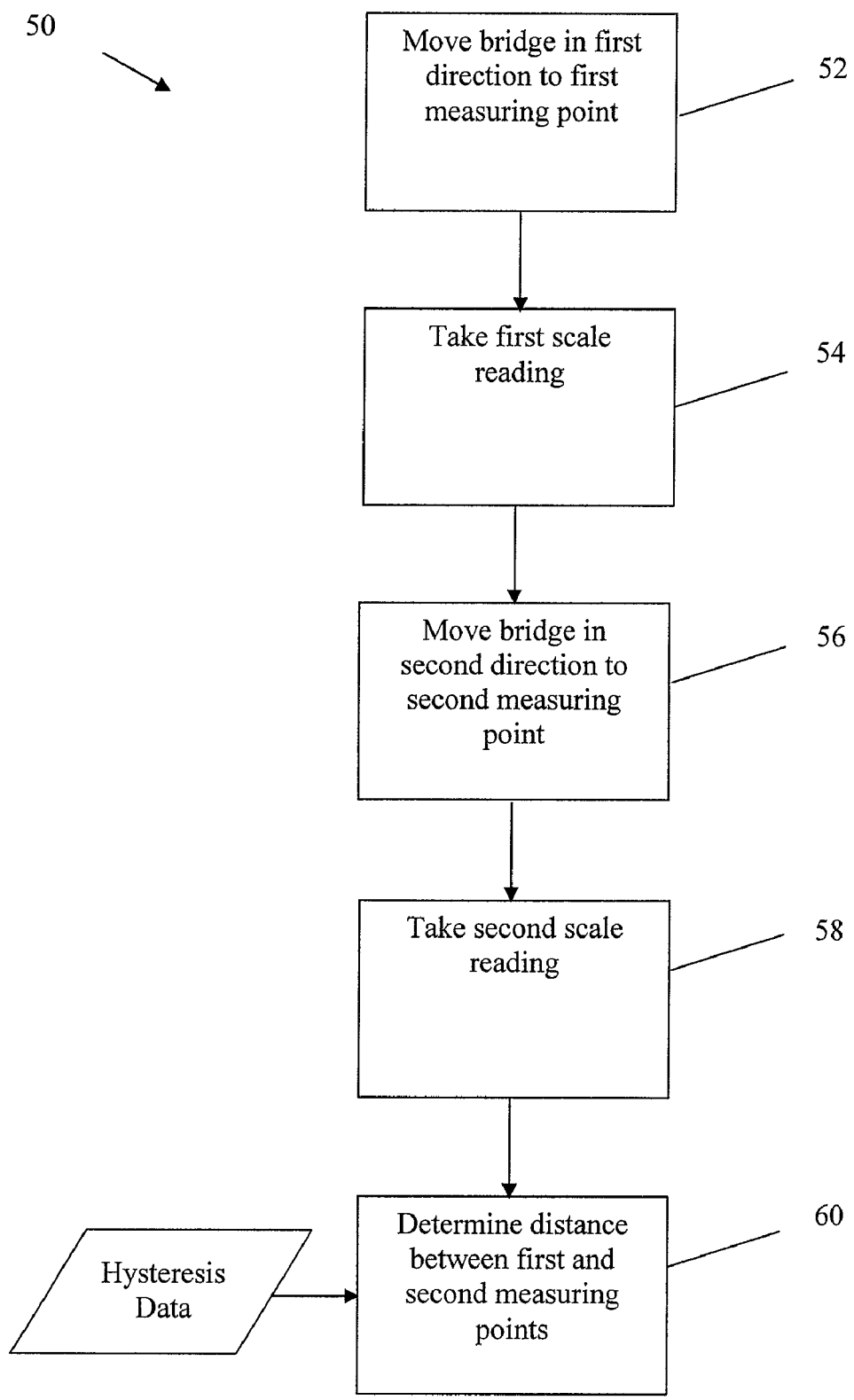
FIG. 5 is a flowchart illustrating a method of compensating for hysteresis error according to one embodiment of the invention.

A method 50 of determining a value for a target measurement of a workpiece feature is illustrated in a flowchart in FIG. 5. In act 52, the bridge is moved in a first direction to a first measuring point, such as the point at which the probe contacts the workpiece. A first scale reading of the bridge position is then taken in act 54, providing a first coordinate value. In act 56, the bridge is moved in a second direction to a second measuring point, and a second scale reading of the bridge position is taken in act 58. In act 60, a value for the target measurement (such as distance between the two measuring points) of the workpiece is determined, and the determined value includes a compensation for hysteresis error.

The act of determining a value for the target measurement of the workpiece can take many forms. In one embodiment, when determining the position of a point on a workpiece, an adjustment is applied to the first scale reading based on the x-coordinate of the carriage and the direction of movement of the bridge at the point of contact of the probe to the workpiece. Similarly, another adjustment (which could be the same as or different from the first adjustment) is applied to the second scale reading based on the x-coordinate of the carriage and the direction of movement of the bridge at the point of contact of the probe to the workpiece. The difference between the two adjusted scale readings provides a measurement value (such as length) that compensates for the hysteresis error.

Method 50 is merely an illustrative embodiment of a method of determining a value for a target measurement of a workpiece feature. Such an illustrative embodiment is not intended to limit the scope of the invention, as any of numerous other methods of such a system, for example, variations of method 50, are possible and are intended to fall within the scope of the invention.

In another embodiment, the difference between the two scale readings is calculated first, and then the two adjustments are made to the calculated difference. As one illustrative example of determining a value for a target workpiece feature measurement, let us assume that a series of calibration blocks known to be 10 millimeters in length to within less than one micron are measured by the coordinate measuring machine to have an average length of 9.992 mm, resulting in an assumed hysteresis error of 8 microns. Let us also assume that this calibration was performed at a distance of 60 centimeters from the measuring scale, and the calibration blocks were secured in parallel with the scale. A rectangular workpiece approximately 20 centimeters long is then secured to the table such that the length is parallel to the scale and the longitudinal axis of the workpiece is 30 centimeters from the scale. The probe is moved to a first longitudinal end of the workpiece and a first scale reading is taken with the resulting, y-coordinate value being 14.4730 cm. The probe is then moved to a second end and a second scale reading is taken, with the resulting y-coordinate value being 34.6364 cm. The difference between the two scale readings is therefore 20.1634 cm. To determine a hysteresis adjustment value, the previously calculated hysteresis error data of 8 microns is multiplied by the ratio of 30 cm/60 cm (the ratio of the distances of each of the workpiece and the calibration block from the measuring scale). The adjustment value of 4 microns is then added to the value 20.1634 to arrive at a length measurement of 20.1638.

The particular order or manner of performing the mathematics associated with compensating for the hysteresis error is not intended to be limiting, unless positively claimed. For example, in another embodiment, where the first and second scale readings occur at the same x-direction distance from the scale and the direction of movement of the bridge during each of the two scale readings are opposite to one another, one of the scale readings may be adjusted by the full amount of hysteresis error, i.e. lost motion, and the other of the scale readings remains unadjusted.

It should be noted that when performing calculations that are based on the x-direction position of the carriage at two different measurement points, the calculation is considered to be based on both x-direction positions even if the x-direction position is the same for both measurement points and the calculation does not explicitly retrieve an x-direction position for both measurement points. For example, a calculation may be performed wherein the x-direction position at the first measurement point is known, and it is also known that the two x-direction positions are the same. In such a case, an explicit retrieval of the second x-direction position is not required for a calculation to be considered as being based on both x-direction positions.

Figure 6:
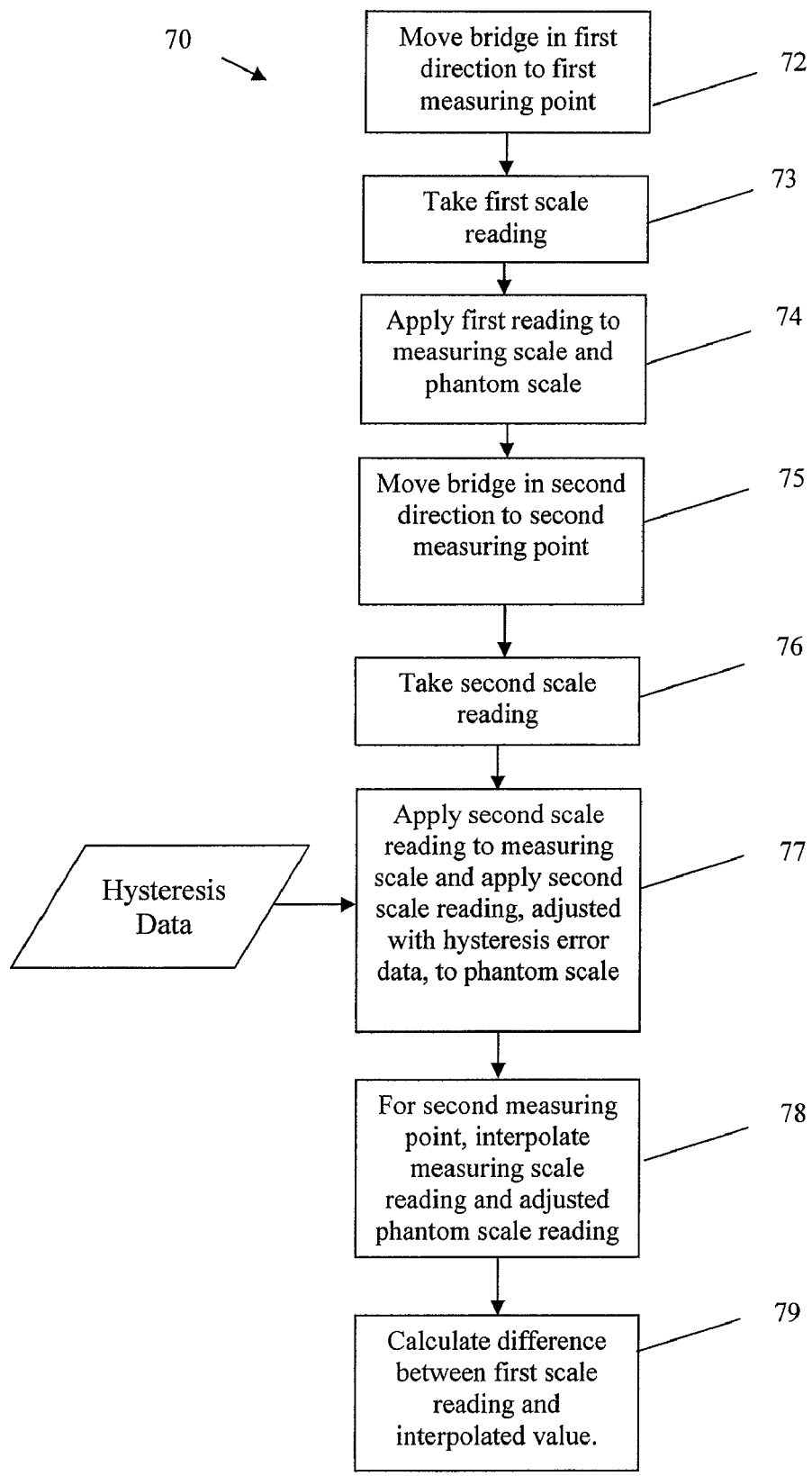
FIG. 6 is a flowchart illustrating a method of compensating for hysteresis error according to a further embodiment of the invention.
Figure 7:
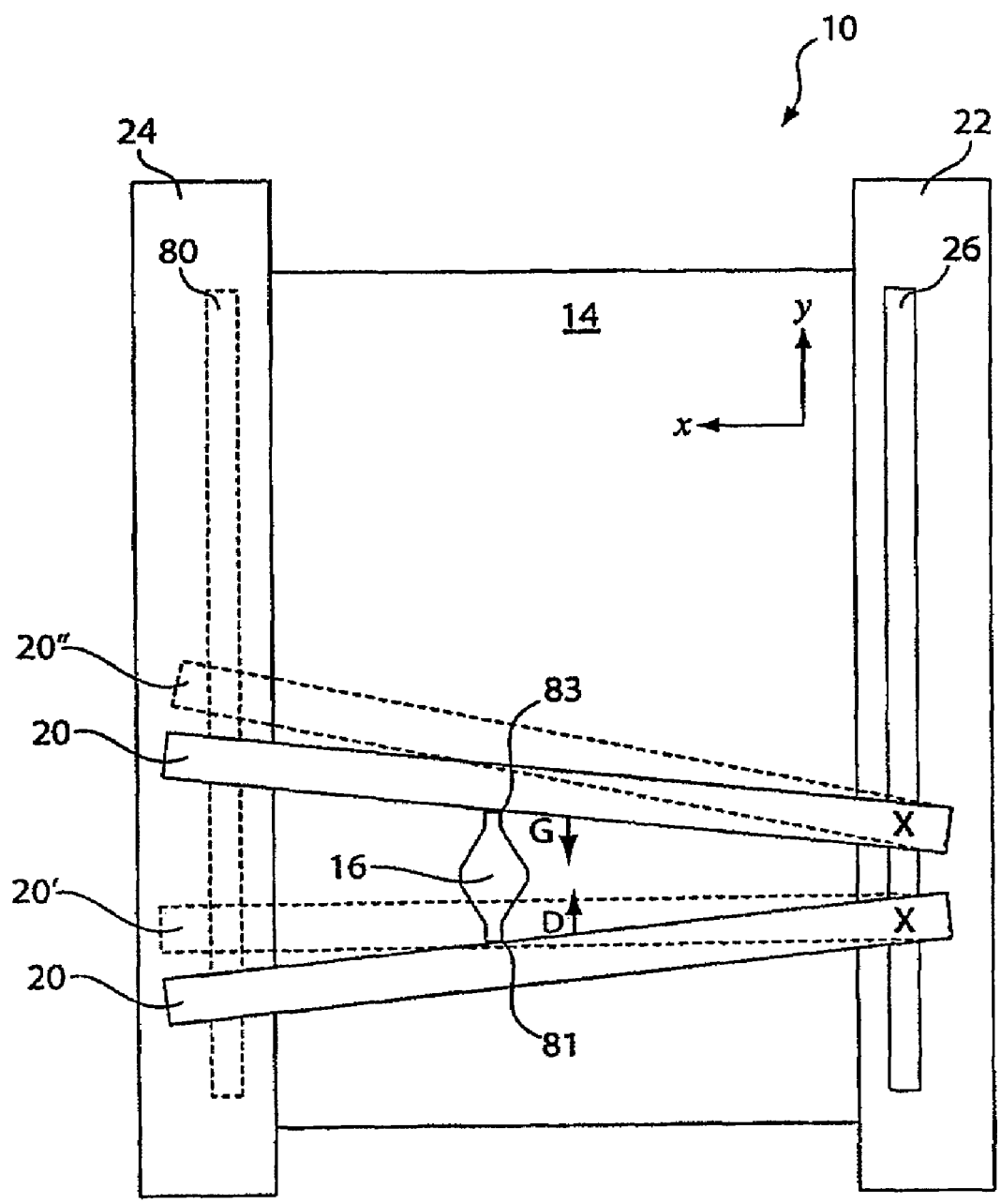
FIG. 7 is a schematic top plan view of the gantry-type coordinate measuring machine illustrated in FIGS. 3 and 4, showing a physical representation of the use of a phantom scale to compensate for hysteresis error.

Another embodiment of determining the position of a workpiece feature is illustrated in FIGS. 6 and 7. In this embodiment, a mathematical construct including the use of a "phantom scale" is used in determining a measurement value that compensates for hysteresis error. Referring now to a method 70 shown in a flowchart in FIG. 6 and coordinate measuring machine 10 in FIG. 7, a phantom scale 80 is assumed to be present on the guideway opposite to the guideway 22 which includes measuring scale 26. In this manner, values can be assigned to both measuring scale 26 and phantom scale 80, thereby providing a suitable number and kind of inputs to be passed to software and/or firmware that expects measurement data from a dual-scale coordinate measuring machine.

Similar to embodiments described above, before performing a measurement on a workpiece, a calibration is conducted to gather hysteresis data. In the present embodiment, the hysteresis error value (lost motion) that is determined at the x-axis position of the calibration block (or other calibration element) is extrapolated to determine the lost motion at the x-axis position of phantom scale 80. As mentioned above, the calibration may occur immediately before a measurement operation, or a calibration may be performed once and then applied to a large number of subsequent measurement operations.

To proceed with a measurement operation, in act 72, bridge 20 is moved in a first direction (arrow D) to a first measuring point 81 on workpiece 16. A first scale reading is taken with bridge measuring scale 26 in act 73. In act 74, the value of this scale reading is assigned without adjustment to both measuring scale 26 and phantom scale 80. A physical representation of this mathematical construct is shown as a dashed bridge 20' in FIG. 7. In act 75, the bridge is moved in a second direction (arrow G) to a second measuring point 83, and in act 76, a second scale reading is taken with measuring scale 26. In act 77, the value of the second scale reading is assigned without adjustment to measuring scale 26. With the information that the second direction is opposite to the first direction, the full value of hysteresis compensation at the x-axis position of phantom scale 80 is added to the value of the measuring scale reading, and the sum is assigned to phantom scale 80 as a scale reading. A physical representation of this mathematical construct is shown as dashed bridge 20'.

The values of all four assigned scale values are then passed (either directly or indirectly) to software and/or firmware which determines the length of the measured feature. In this embodiment, the y-coordinate value of the second measuring point is determined in act 78 by interpolating the second scale reading value and the adjusted second value that was assigned to the phantom scale. In act 79, the first measuring point value is subtracted from the second measuring point value to calculate the length of the workpiece feature. As with embodiments described above, a linear relationship between may be assumed to exist between the x-axis position of the carriage and the fraction of the hysteresis error present at that x-axis position. For example, at a carriage x-axis position ⅓ of the distance from measuring scale 26 to phantom scale 80, it may assumed that ⅓ of the hysteresis error present at phantom scale 80 is present at the carriage. It should be noted that in some embodiments, relationships other than linear relationships may be used, and the assumption of a linear relationship is only given as one example.

The method described with reference to FIGS. 6 and 7 may, in some instances, have the advantage of being seamlessly integratable into existing software and/or firmware packages that use four scale readings (two from each scale) to determine a distance on a workpiece. In some cases the method described above is worked into existing software and/or firmware, while in other cases, a separate software or firmware module is used to preprocess the measuring scale readings into a form suitable for input into existing software and/or firmware.

As one illustrative example, let us assume that a calibration of coordinate measuring machine 10 resulted in hysteresis error data of 10 microns at a distance of 50 centimeters from measuring scale 26. For purposes of this example, let us also assume that the software and/or firmware associated with the coordinate measuring machine is configured to analyze readings from two parallel measuring scales that are 60 centimeters apart in the x-direction. Extrapolating the hysteresis error of 10 microns at the x-axis position of 50 centimeters to an x-axis position of 60 centimeters (i.e., the position of phantom scale 80) results in a hysteresis error of 12 microns.

For purposes of this example, let us assume that the y-direction length of a workpiece feature is then measured at a distance of 30 centimeters from measuring scale 26, i.e., halfway between measuring scale 26 and phantom scale 80. The first scale reading, taken with the probe at first measuring point 81, results in a y-coordinate value of 7.516 mm. The value of 7.516 mm is saved as the first target point value for both measuring scale 26 and phantom scale 80. The second scale reading, taken with the probe at second measuring point 83, results in a y-coordinate value of 12.556 mm. The 12.566 mm value is saved as the scale rending for scale 26. The lost motion of 12 microns is added to the second scale reading of 12.566 mm, arriving at a phantom scale second reading of 12.578 mm. The four readings (7.516 mm; 7.516 mm; 12.566 mm; and 12.578 mm) are then passed to software and/or firmware which determines the length of the measured workpiece feature. The first two readings are interpolated, obviously resulting in a value of 7.516. The second two readings are interpolated as follows: 12.566 mm+[(12.578−12.566)*(30 cm/60 cm)]=12.572 mm. The difference between 7.516 mm and 12.572 mm (5.056 mm) is given as the measured length of the workpiece feature. Without the compensation for lost motion, the coordinate measuring machine would have underestimated the length by six microns and provided a result of 5.050 mm.

In variations of this embodiment, rather than applying the entire lost motion to one of the phantom scale values, each of the values applied to the phantom scale may include a portion of the overall hysteresis error adjustment. In embodiments where two positions are being measured at different x-coordinate positions, the hysteresis error adjustment may be appropriately apportioned to the two phantom scale readings. It should be noted that hysteresis error adjustments do not necessarily have to be made only to the values assigned to the phantom scale. In some embodiments, the unadjusted scale readings may be assigned to the phantom scale, and adjusted scale readings may be applied to the measuring scale.

The various embodiments of the invention are not restricted to gantry-type coordinate measuring machines. The methods, apparatuses, software and firmware disclosed herein may be used with or as part of other coordinate measuring machines, such as bridge-type coordinate measuring machines or horizontal coordinate measuring machines.

The embodiments described herein are not necessarily restricted to measurements in a single horizontal plane within the measuring volume as they can be employed to perform coordinate measurements at different vertical heights and still compensate for hysteresis error. In some embodiments, the vertical position of the probe does not affect hysteresis error, while in other embodiments, the vertical position of the probe plays a role in the ultimate effect of hysteresis.

Figure 8:
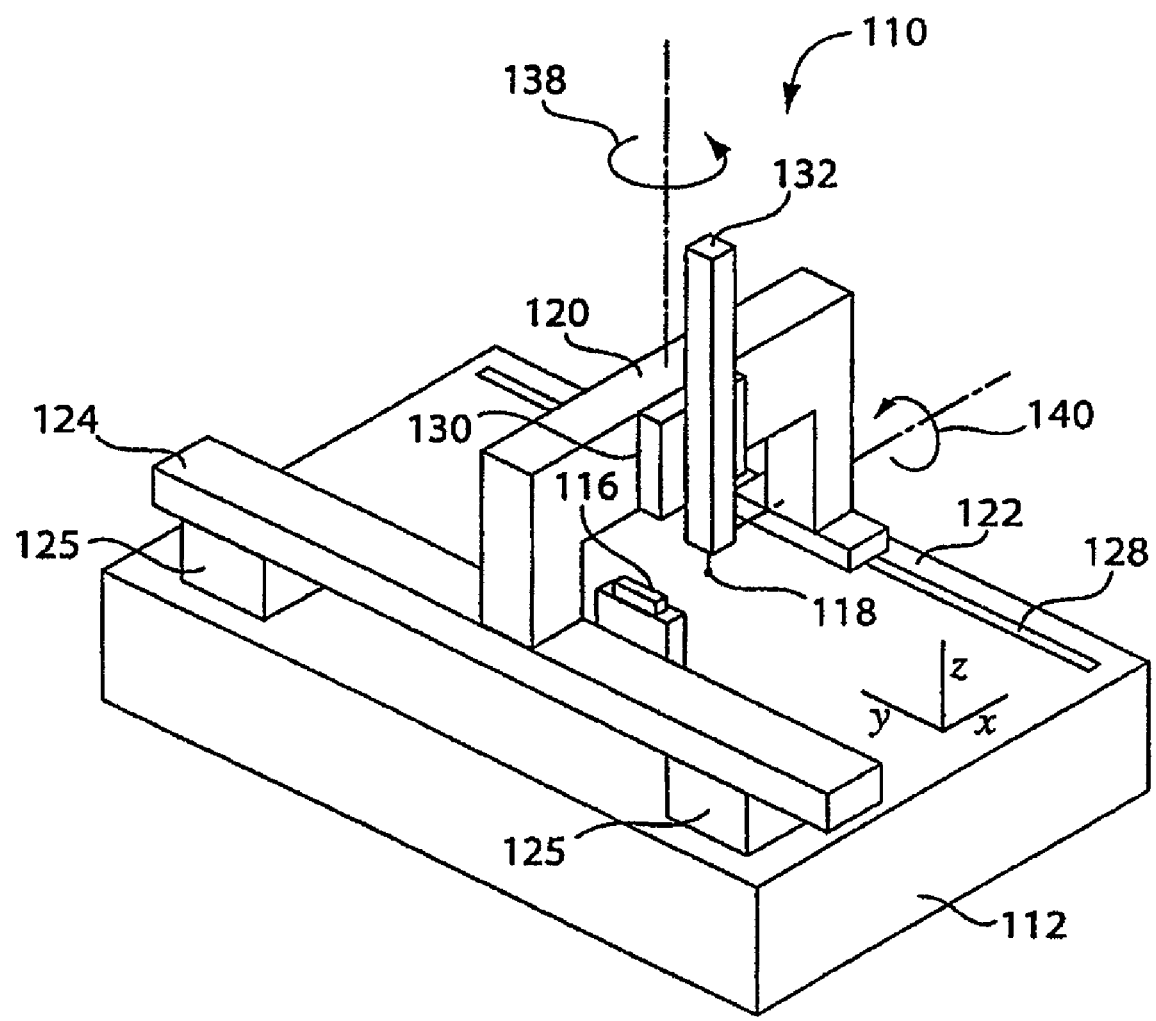
FIG. 8 is a perspective view of a bridge-type coordinate measuring machine according to yet a further embodiment of the invention.

For example, as shown in FIG. 8, a bridge-type coordinate measuring machine 110 is shown preparing to take coordinate measurements of a calibration block 136 at different heights. Here, one of guideways 122, 124 for a bridge 120 is not elevated above a base 112 by legs. Instead, guideway 124 is at or near the level of a table 114. Similar to the situation with a gantry-type coordinate measuring machine, when only one side of the bridge assembly is driven, bridge 120 rotates slightly about a z-axis and create yaw error (see rotation arrow 138). Different from a gantry-type coordinate measuring machine, with guideways 122, 124 at different vertical heights, hysteresis effects may cause the bridge assembly to rotate slightly about an x-axis and create pitch error. For instance, if the single drive system is present on right guideway 122, and bridge 120 is moving toward the front of the machine, friction from left guideway 124 pitches bridge 120 about an x-axis toward the rear of the machine (see rotation arrow 140). When probe 118 is vertically close to bridge 120, the effect of a pitch angle has less of an effect than when probe 118 is a substantial distance from bridge 120.

To compensate for both the yaw error and pitch error caused by hysteresis, calibration measurements may be taken at multiple locations within the measurement volume to determine the effects of hysteresis error at particular probe distances from the bridge and from the bridge scale. For example, a calibration measurement may be taken at each of two (or more) different z-axis positions while holding the x-axis position constant, and a calibration measurement may be taken at two (or more) different x-axis positions while holding the z-axis position constant. As with the gantry-type coordinate measuring machine, error adjustments to scale readings of workpiece features can be applied by using a ratio of the distance of the workpiece from a reference line relative to the distance of the calibration block (or slot) from the same reference line.

According to another aspect of the invention, a coordinate measuring machine is designed to reduce the combined effects of hysteresis error and other dynamic errors, such as shimmy, caused by motor cogging and/or acceleration/deceleration. In addition to the relatively consistent hysteresis which occurs as a result of bearing (or associated element) friction on the non-driven side of the bridge, motor cogging effects can introduce a variable error component that oscillates between two extremes. As described above in the description of the related art, the motor cogging exhibited in many electric motors can cause shimmying in various components. For example, as the bridge travels in the y-direction, motor cogging can cause the bridge to shimmy in a forward and backward direction. This motor cogging effect typically exhibits a sinusoidal pattern as the bridge travels in the y-direction. Thus, for any given scale reading, a variable error could be present at a value somewhere at or between positive and negative extremes. For some scale readings, the variable error could be zero. Other sources of variable error may be present as well, including the entry of ball into the track of a re-circulating bearing and/or acceleration/deceleration of the bridge.

The effect of the motor cogging on a y-axis measurement depends on the x-direction distance of the carriage from the scale, but for a different reason than the more consistent hysteresis error discussed herein. Increasing the distance of the mass of the carriage from the motor increases the magnitude of shimmy. Therefore, the amount of potential variable error which adds to or subtracts from the more consistent hysteresis error increases with increasing distance of the probe from the scale. While sometimes the shimmy error is in a direction opposite to the hysteresis error, in a worst-case scenario from a yaw error standpoint, a measurement might be taken while, simultaneously, the probe is at a maximum distance from the bridge scale, the carriage is at a maximum distance from the motor, and the sinusoidal pattern of the motor cogging error is at an extreme in the same direction as the hysteresis error.

According to one embodiment of the invention, the single bridge scale is positioned on the guideway that is opposite the drive side guideway. In this manner, at the x-direction positions at which the hysteresis errors are at their maximum (i.e. the probe is far from the scale), the potential motor cogging effects are at their minimum (i.e. the carriage is close to the motor). Conversely, at the x-direction positions at which the motor cogging effects are at their maximum (i.e. the carriage is far from the motor), the hysteresis errors are at their minimum (i.e. the probe is close to the scale). With such an arrangement, the maximum possible error resulting from the combination of motor cogging effects and hysteresis error is reduced when compared to an arrangement where the scale and drive are positioned on the same guideway.

Compensation For x-Component Errors Caused by Bridge Yaw Rotation

As discussed above, friction at the non-driven end of a bridge may cause the non-driven end to lag slightly behind the driven end. This friction may rotate the bridge about a vertical axis such that yaw error may exist in the bridge. Various embodiments described above address correction of any yaw error effect in the measured y-axis position of the probe as compared to the actual y-axis position of the probe. The yaw error also affects the measured x-axis position of the probe as compared to the actual x-axis position of the probe. According to one aspect of the invention, a method is provided for compensating for the effect of yaw error on measuring distances that include an x-direction component.

Figure 9:
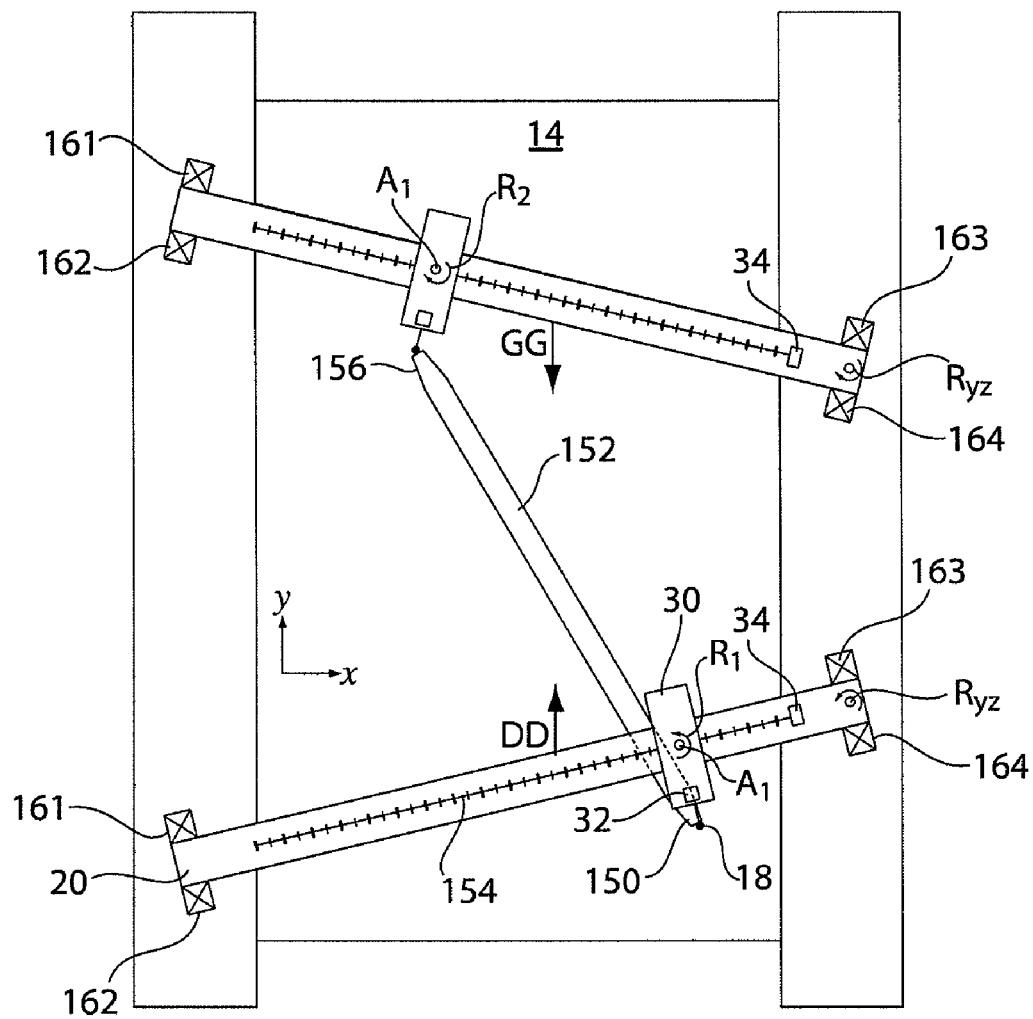
FIG. 9 is a schematic top plan view illustrating a gantry-type coordinate measuring machine with a probe being shown in two different positions during the measurement of a block.

One source of hysteresis error in the x-direction is illustrated in FIG. 9. If bridge 20 is driven only on one side such as by drive element 34 (the right side, as shown in FIG. 9, or the driven side), and bridge 20 moves in the direction of arrow DD (i.e., in the +y direction), the other side of the bridge (the left side, as shown in FIG. 9, or the non-driven side) may lag behind the driven side due to friction, thereby causing a counter-clockwise yaw rotation $R_1$ (when viewed from the positive z-axis direction toward the negative z-axis direction) in bridge 20 around a rotation axis $A_1$ which is parallel to the z-axis. The friction on the non-driven side may result from bearings 161, 162. Yaw rotation $R_1$ of bridge 20 moves probe 18 in the +x direction. As a result, carriage 30 has to move farther in the −x direction (to the left, as shown in FIG. 9) to bring probe 18 into contact with a first end 150 of a workpiece 152 than would be necessary if bridge 20 did not have any yaw rotation. Accordingly, the x-component reading on a carriage scale 154 (x-component scale) may read a lower value than a true value.

Similarly, when measuring a second end 156 of workpiece 152, movement of bridge 20 in direction GG (i.e, in the −y direction) results in a clockwise yaw rotation $R_2$ (when viewed from the positive z-axis direction toward the negative z-axis direction). This yaw rotation moves probe 18 in the −x direction, and thus carriage 30 moves further in the +x-direction to bring probe 18 into contact with second end 156 as compared to a condition in which no yaw rotation of bridge 20 occurs. Accordingly, the x-component reading on carriage scale 154 (x-component scale) may read higher than a true value.

As a result of the measurement of first end 150 being too low and the measurement of second end 156 being too high, the x-component length of workpiece 152, and hence the overall workpiece length, may be determined to be shorter than its actual length.

The net effect of the yaw rotation on the x-axis measurements depends on the y-component distance of the measurement point (e.g., probe 18) from the yaw error rotation axis of bridge 20. For example, as shown in exaggerated form in FIG. 10, when a probe is in a first position (shown as 18a) which is close to bridge 20 (and therefore close in the y-direction to yaw error rotation axis $A_1$), the x-component error $\epsilon_a$ resulting from yaw rotation $R_1$ is less than an x-component error $\epsilon_b$ resulting from yaw rotation $R_1$ when the probe is positioned in a second position (shown as 18b) farther from yaw error rotation axis $A_1$. In the condition shown in FIG. 10, the counterclockwise rotation of bridge 20 moves the probe in the positive x-direction relative to where the probe would be positioned if no bridge rotation occurred, which results in the carriage moving further in negative x-direction to make contact with a workpiece. Accordingly, the value of the measurement error (e.g., $\epsilon_a$ and $\epsilon_b$) in this condition would be a negative number, and an error adjustment to the measurement would be the addition of a positive value.

Figure 10:
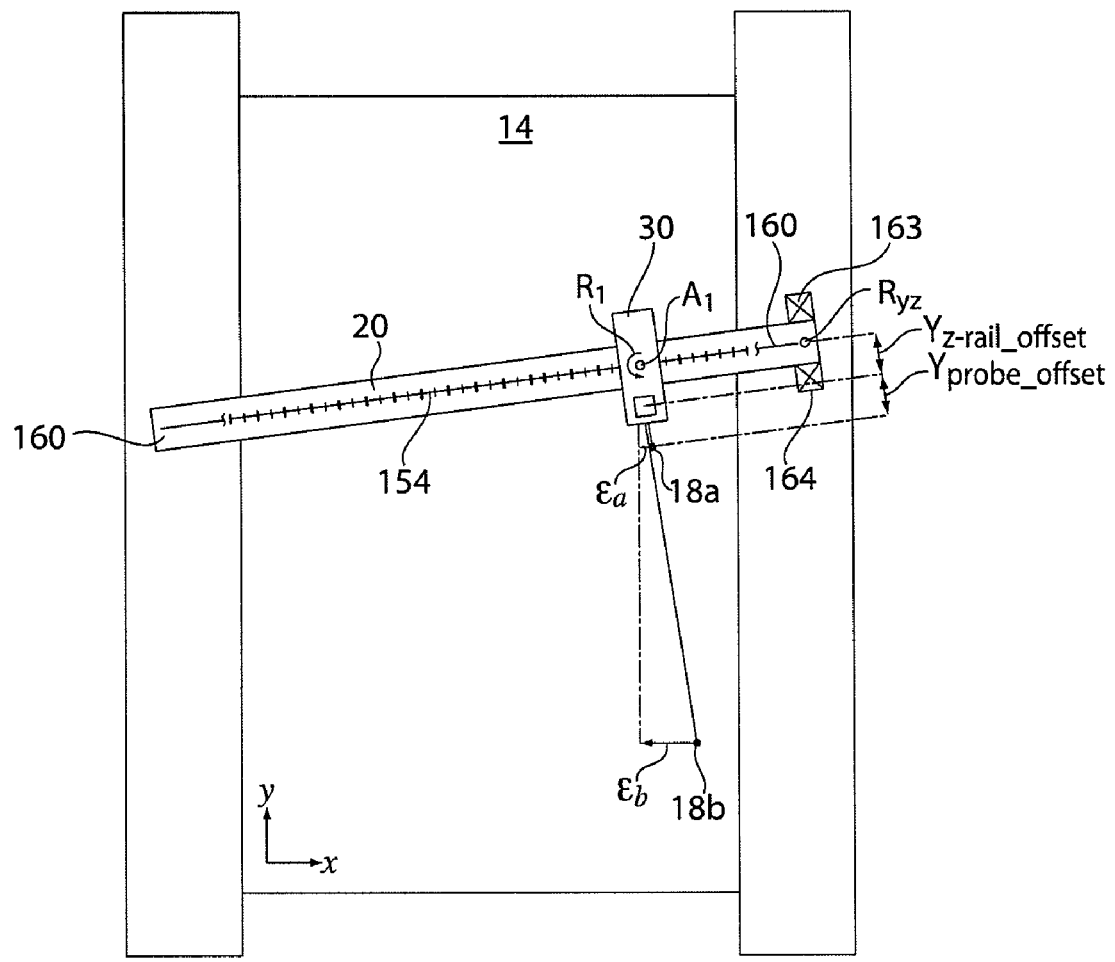
FIG. 10 is a schematic top plan view showing the effect of the distance of the probe from the carriage scale on x-coordinate measurement error.

For x-component error computational purposes, the bridge position of yaw error rotation axis $A_1$ can be assumed to be at the intersection of: a) a line that is co-linear with the bridge and intersects the actual yaw error rotation axis $R_{yz}$ and b) a line drawn from the probe to perpendicularly intersect the line of a). In FIGS. 9 and 10, these computational constructs are shown as $A_1$. In reality, the actual yaw error rotation axis $R_{yz}$ is typically located between drive-side bearings 163, 164, both in the x-direction and the y-direction. It should also be noted that the term "axis" as it relates to rotation axes, does not necessarily imply a physical element such as a rod. Instead, the term "axis" can mean a mathematical construct such as a line in space about which a physical element rotates.

One method of determining x-component hysteresis error when probing a single location on a workpiece includes using the equation:

$$\epsilon_x = -R_{yz} * (Y_{z\_rail\_offset} + Y_{prob\_offset}) \qquad (1)$$

where $R_{yz}$ is the counterclockwise rotation of the bridge in radians (as viewed from the positive z-axis direction toward the negative z-axis direction), $Y_{probe\_offset}$ is the y-direction distance of the probe from the vertically-movable ram 32, and $Y_{z\_rail\_offset}$ is the y-direction distance of the vertically-movable ram 32 from a reference, such as the yaw error rotation axis or carriage scale 154. The term ($Y_{z\_rail\_offset} + Y_{probe\_offset}$) may be represented by at term ($Distance_{probe}$) which represents the total y-direction distance of the probe from a reference.

A value for $R_{yz}$ may be determined by measuring calibration block lengths in a known manner and determining a value for $R_{yz}$ which results in adjusted x-component length measurements (e.g., by subtracting the results of Equation (1) from the length measurements) that match the known x-component lengths of the calibration blocks. Alternatively, a value for $R_{yz}$ may be determined by measuring calibration block lengths in a known manner and calculating a value for $R_{yz}$ which results in adjusted y-component length measurements that match the known y-component lengths of the calibration blocks. A value for $R_{yz}$ may be determined for a particular machine for use with that particular machine, or, in some embodiments, a plurality of coordinate measuring machines may be tested, and an average value (or other statistic) of $R_{yz}$ may be used for additional machines.

Once the error $\epsilon_x$ is determined from Equation 1 above, the value measured on carriage scale 154 may be adjusted by an amount that is the opposite sign of the value of $\epsilon_x$. In this embodiment, if contact of probe 18 with the workpiece occurs with bridge 20 travelling in the +y direction, the value of $\epsilon_x$ will be a negative number, and thus the measured value will have a positive value added to adjust for the hysteresis error. Equation (1) also may be used when the contact of probe 18 with the workpiece occurs with bridge 20 moving in the −y direction. However, because bridge 20 rotates clockwise (as viewed from the positive z-axis direction toward the negative z-axis direction) when traveling in the −y direction, the value of $R_{yz}$ will be a negative number, and thus the value of $\epsilon_x$ will be a positive number, and the value measured on carriage scale 154 may be adjusted by $-\epsilon_x$.

In some embodiments, the value of $Y_{z-rail\_offset}$ may be assigned a value equal to the distance of the vertically-movable ram from a line 160 equidistant from the drive-side bearings 163, 164.

In some embodiments, the value of $Y_{z-rail\_offset}$ may be determined experimentally. For example, the x-component length of a calibration block may be measured in two or more different diagonal alignments on the table of the coordinate measuring machine. One diagonal alignment may be in the (+x +y) direction, and another diagonal alignment may be in the (−x +y) direction. With hysteresis error, the unadjusted measured lengths of these two alignments will differ. A value may be determined for $Y_{z-rail\_offset}$ such that subtracting $\epsilon_x$ (calculated from Equation (1) above) from each carriage scale measurement results in adjusted x-component lengths that are equal for each diagonal alignment. The value for $Y_{z-rail\_offset}$ that results in equal length determinations for each diagonal alignment may be determined by solving for $Y_{z-rail\_offset}$ given values for $R_{yz}$, $Y_{probe\_offset}$, and the unadjusted measured lengths of the two diagonal alignments. In alternative embodiments, a value for $Y_{z-rail\_offset}$ may be determined by iteratively testing different values until the adjusted measurements for the two alignments have a difference of less than a selected amount.

If carriage scale 154 is positioned closely in the y-direction to yaw error rotation axis $A_1$ (e.g., an extension of scale 154 would intersect or almost intersect the actual rotation point located between the drive-side bearings), then scale 154 has a minimal or negligible translation in the x-direction as a result of the yaw error rotation. However, if scale 154 is mounted at a non-negligible distance in the y-direction from axis $A_1$ (e.g., toward the front of bridge 20), then scale 154 would shift in the x-direction when bridge 20 rotates. Accordingly, a translation term $C_2$ may be added to Equation (1) in certain embodiments to account for this difference:

$$\epsilon_x = C_2 - R_{yz}*(Y_{z-rail\_offset} + Y_{probe\_offset}) \quad (2)$$

$C_2$ may be determined experimentally by measuring a calibration block length at several different alignments within the XY plane while holding $Y_{z-rail\_offset}$ and $Y_{probe\_offset}$ constant and assuming a constant $R_{yz}$ for each direction of bridge travel. A suitable value for $C_2$ may be determined by iteratively inputting values for $C_2$ until substantially constant adjusted lengths are found for all of the alignments of the calibration block. $C_2$ may be a positive or negative value. In many embodiments, $C_2$ may be approximately zero if the carriage scale is co-linear or close to line 160.

In some embodiments, a constant (e.g., $C_2$) is not used in error calculations. In some embodiments, experimentally determining a value for $C_2$ may result in a $C_2$ that adjusts for other potential sources of error, such as, for example, probe lobing. $C_2$ may be determined for each particular coordinate measuring machine, or, in some embodiments, an average $C_2$ may be determined by calibrating a plurality of machine, and the average $C_2$ may be used for other coordinate measuring machines.

Figure 11:
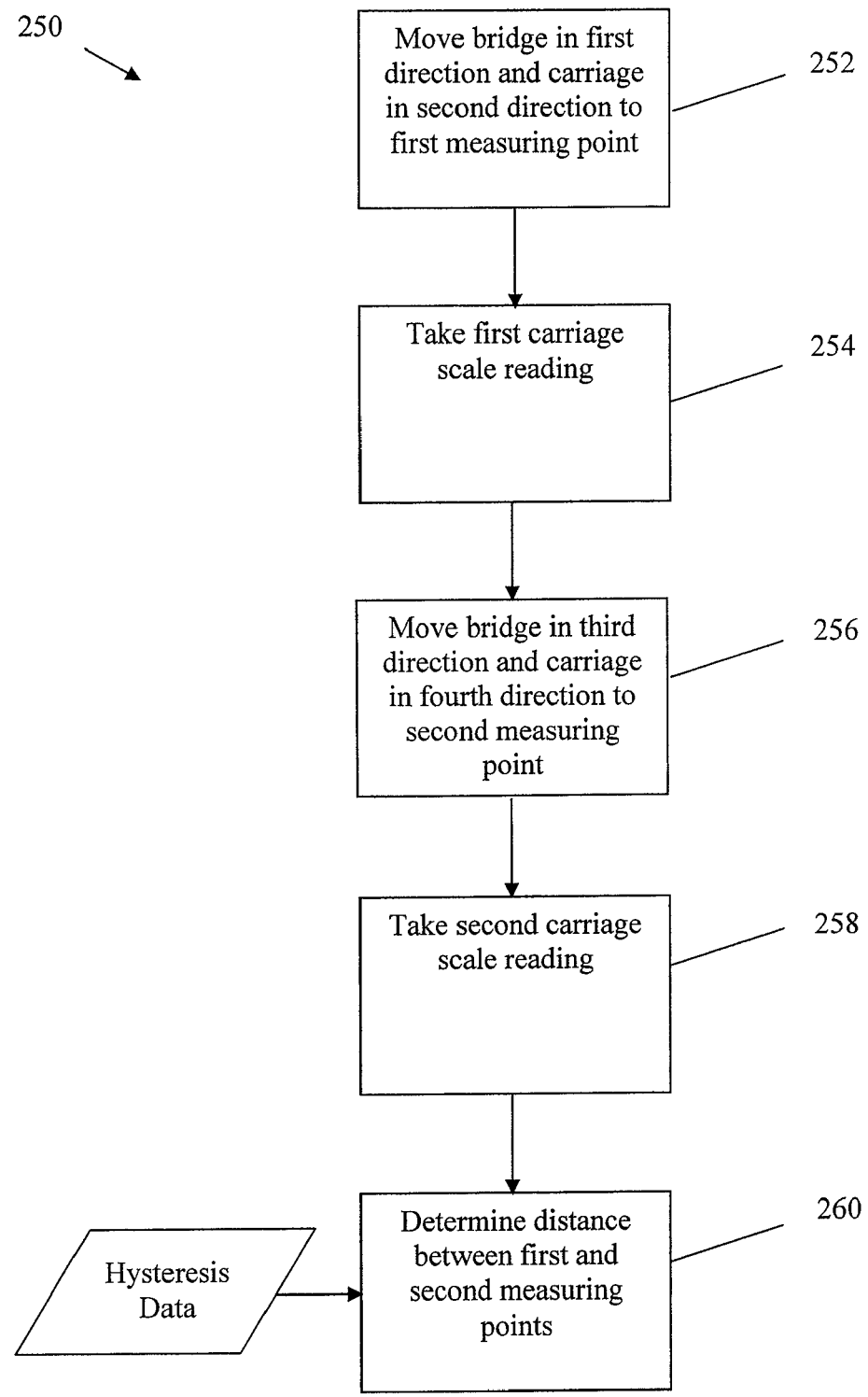
FIG. 11 is a flowchart illustrating a method of compensating for hysteresis error according to one embodiment of the invention.

A method 250 of determining a value for a target measurement of a workpiece feature using a coordinate measuring machine which includes a bridge and a carriage is illustrated in a flowchart in FIG. 11. In an act 252, the bridge is moved in a first direction and the carriage is moved in a second direction to a first measuring point, such as the point at which the probe contacts the workpiece. A first scale reading of the carriage position is then taken in an act 254, providing a first coordinate value. In an act 256, the bridge is moved in a third direction, opposite to the first direction, and the carriage is moved in a fourth direction to a second measuring point, and a second scale reading of the carriage position is taken in an act 258. In an act 260, a value for the target measurement (such as distance between the two measuring points) of the workpiece is determined, and the determined value includes a compensation for hysteresis error.

Act 260 of determining a value for the target measurement of the workpiece can take many forms. In one embodiment, when determining the position of a point on a workpiece, an adjustment is applied to the first scale reading of the carriage position based on Equation (2) above. Equation (2) is based on the direction of movement of bridge 20 by virtue of the sign of $R_{yz}$. Equation (2) also is based on the y-direction offsets of probe 18. Similarly, another adjustment (which could be the same as or different from the first adjustment) is applied to the second scale reading based on Equation (2). The difference between the two adjusted scale readings provides a length measurement value which compensates for the hysteresis error.

Method 250 is merely an illustrative embodiment of a method of determining a value for a target measurement of a workpiece feature. Such an illustrative embodiment is not intended to limit the scope of the invention, as any of numerous variations of method 250 are possible and are intended to fall within the scope of the invention.

For example, in embodiments where $R_{yz}$ has a similar absolute value for clockwise and counterclockwise rotations, instead of adjusting each of two measurements (the first measurement occurring with bridge movement in a first direction and the second measurement occurring with bridge movement in a third direction), the method may include an act of adjusting all measurements that occur with the bridge moving in the first direction with double the result of Equation 2. In this embodiments, measurements that occur with the bridge moving in the second, opposite direction, no adjustment would be made. Such a method assumes that probe 18 remains a fixed y-direction distance from its reference.

Compensation For Hysteresis Error Caused by Rotation of Vertically-Movable Ram

Figure 12:
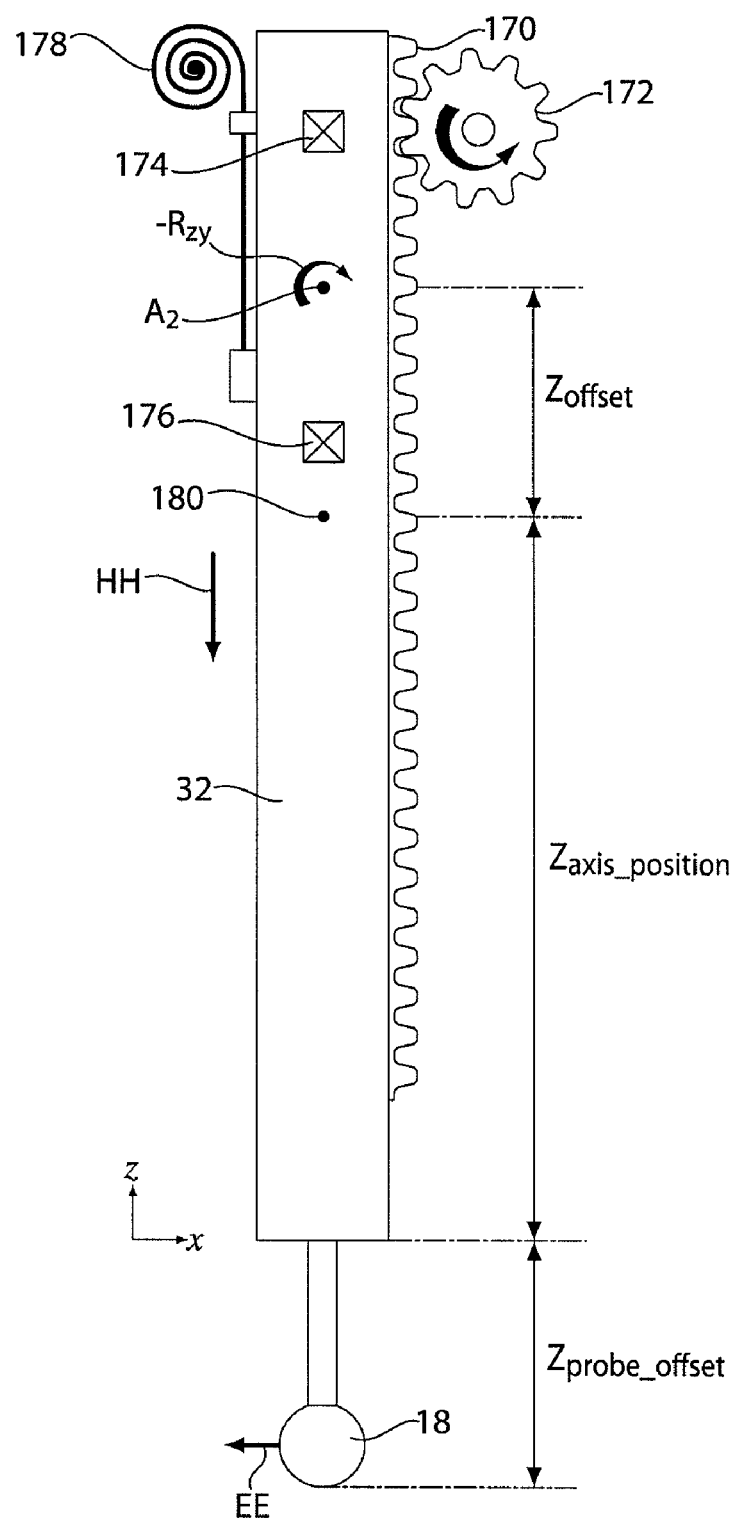
FIG. 12 is a schematic front view of a vertically-movable ram.

According to another aspect of the invention, a method includes compensating for hysteresis errors caused by friction in the bearings and/or counterbalance system of the vertically-movable ram 32. For example, as schematically illustrated in FIG. 12, vertically-movable ram 32 moves probe 18 upwardly and downwardly in the z-direction using a rack 170 and pinion 172 system. During movement, vertical ram bearings 174 and 176 create friction as does counterbalance system 178. This friction may rotate vertically-movable ram 32 within the XZ plane, which may shift probe 18 in either the +x or the −x direction.

When vertically-movable ram 32 moves downwardly in the embodiment of FIG. 12, friction may cause ram 32 to rotate clockwise, which shifts probe 18 in the −x direction. Conversely, upward movement of ram 32 may shift probe 18 in the +x direction. The x-direction hysteresis error movements of probe 18 cause the carriage 20 (on which ram 32 is mounted) to be at a slightly different position along the carriage scale when probe 18 contacts a workpiece than the carriage 20 otherwise would be absent the hysteresis error. In the condition shown in FIG. 12, probe 18 is shifted in the negative x-direction (see arrow EE) by the clockwise rotation of ram 32, and thus a higher x-coordinate value is read from the carriage scale than the true x-coordinate value. Accordingly, the measurement error is a positive value that may be subtracted from the measured carriage scale value.

When a workpiece feature is aligned diagonally within the XZ plane, x-component measurement errors will occur if the z-direction approach of the probe to the workpiece is opposite for each of two measurement points, that is, if probe 18 approaches the first measurement point from below and the second measurement point from above. If the workpiece is aligned diagonally in the (+x +z) direction, the workpiece is measured to be longer than its actual length. If the workpiece is aligned diagonally in the (−x +z) direction, the workpiece is measured to be shorter than its actual length.

To adjust the measurement values in order to account for the ram hysteresis error, a hysteresis error value $\epsilon_x'$ first may be calculated using the equation:

$$\epsilon_x' = C_4 - R_{zy} * (Z_{offset} + Z_{axis\_position} + Z_{probe\_offset}) \quad (3)$$

where $R_{zy}$ is the counterclockwise rotation (as viewed from the positive y-direction toward the negative y-direction in FIG. 12) of vertically-movable ram in the XZ plane around axis $A_2$, $Z_{offset}$ is the z-direction distance from axis $A_2$ to a home position 180 of ram 32, $Z_{axis\_position}$ is the position of ram 32 relative to its home position 180, and $Z_{probe\_offset}$ is the z-direction distance of probe 18 from the end of ram 32. Constant $C_4$, which may be zero in some embodiments, may be added to compensate for the carriage scale being at a different height than the rotation axis of the vertically-movable ram.

Measurements taken from carriage scale 154 then may be adjusted by subtracting the value of $\epsilon_x'$ for each measurement.

In one embodiment, the position of rotation axis $A_2$ is determined by measuring a calibration block length with the calibration block at a first z-position at a second z-position, and optionally at additional z-positions. In some embodiments, the x-coordinate error will be linearly related to the z-direction extension of the z-ram, for example, as the probe is extended closer to the table, and thus further away from $A_2$, the resulting x-coordinate measurement error increases linearly or substantially linearly. From a comparison of the measured values versus the know calibration block measurements, a location of $A_2$ may be determined. With the location of $A_2$ known, a value for $R_{zy}$ for a particular machine may be determined by measuring a calibration block at two different alignments (e.g., two perpendicular alignments) within an XZ plane, and determining a value for $R_{zy}$ such that the two adjusted measurements of the same calibration block are equal to one another. The values for the adjusted measurements may be represented by Equation (3), and $C_4$ may be equal to zero in some embodiments. The calculated value for $R_{zy}$ then may be incorporated into a computer system or computer program associated with the particular coordinate measuring machine.

In other embodiments, determinations of values for $R_{zy}$ may be made for a plurality of coordinate measuring machines, and the average value of $R_{zy}$ may be incorporated into the computer systems or computer programs associated with coordinate measuring machines that were not part of the determination of an average value for $R_{zy}$.

Figure 13:
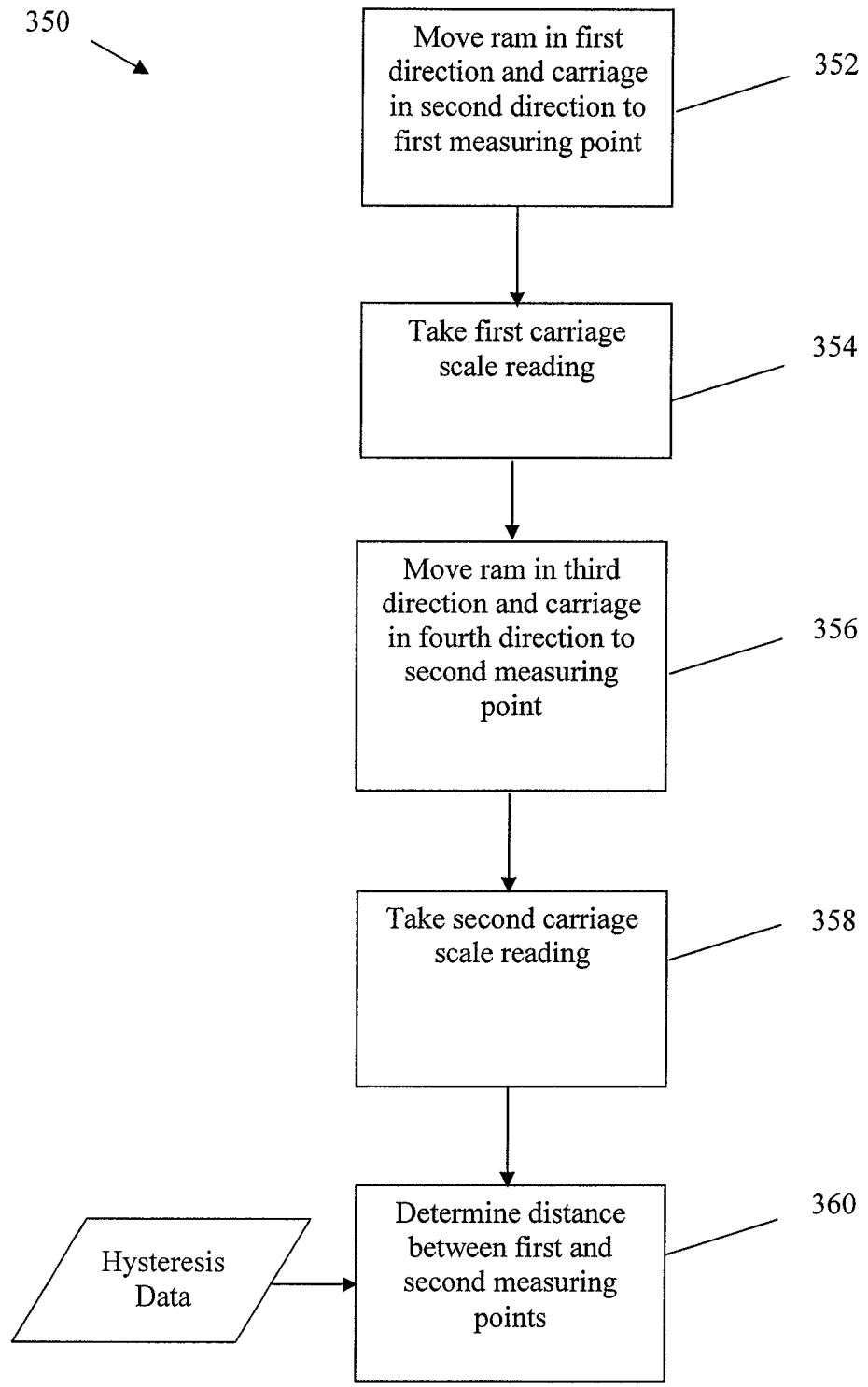
FIG. 13 is a flowchart illustrating a method of compensating for hysteresis error according to one embodiment of the invention.

A method 350 of determining a value for a target measurement of a workpiece feature using a coordinate measuring machine which includes a ram and a carriage is illustrated in a flowchart in FIG. 13. In an act 352, a ram, which may be a vertically-movable ram in some embodiments, is moved in a first direction, and a carriage is moved in a second direction to a first measuring point, such as the point at which a probe contacts a workpiece. A first scale reading of a carriage position is then taken in an act 354, providing a first coordinate value. In an act 356, the ram is moved in a third direction, opposite to the first direction, and the carriage is moved in a fourth direction to a second measuring point, and a second scale reading of the carriage position is taken in an act 358. In an act 360, a value for the target measurement (such as distance between the two measuring points) of the workpiece is determined, and the determined value includes a compensation for hysteresis error.

Act 360 may include the use of Equation (3) above, with a value for $R_{zy}$ being provided as hysteresis data. Equation (3) provides an error for the first and second carriage scale readings, and a corresponding adjustment may be made to the carriage scale readings in determining the x-component of the workpiece feature length. First and second readings from a ram scale are also taken at the first and second measuring points, and these readings are used to determine the z-component length of the workpiece. If the workpiece lies within an XZ plane, the overall length of the workpiece may be determined based on the adjusted carriage scale measurements and the z-ram measurements.

In some cases, a workpiece or workpiece feature may be oriented such that the length of the workpiece feature includes an x-component, a y-component, and a z-component. In such cases, readings from the carriage scale (e.g., x-component readings) may be adjusted to account for hysteresis resulting from bridge movement, and additionally to account for hysteresis error resulting from z-ram movement. Such an adjustment may be performed in some embodiments by determining a total x-component hysteresis error by adding the results of Equation (2) and Equation (3), and then subtracting this total from the carriage scale measurements. Additionally, readings from the bridge scale (e.g., y-component readings) may be adjusted for hysteresis error results from bridge movement, as described above. The overall length of the workpiece feature may be determined based on the adjusted carriage scale measurements, the adjusted bridge scale measurements, and the z-ram measurements.

In some embodiments, a ram that is movable in a direction other than vertical may be used. For example, in a horizontal coordinate measuring machine, a ram may move horizontally and position a probe in the y-direction.

For all embodiments described herein, it should be noted that adjusting measurement values does not necessarily require an explicit calculation of an adjustment term to be added or subtracted to a measurement value. In some cases, an adjusted value (or a value that compensates for errors) may be determined without the explicit use of an adjustment term. Adjustments and compensations also do not require that all errors or all adjustments be incorporated into the adjustments and compensations. A partial or substantial adjustment, for purposes herein, is considered to be an adjustment.

It is important to note that the nomenclature of "x-direction", "y-direction" and "z-direction" used herein does not necessarily imply perpendicular directions, but instead is used to distinguish directions from one another. A z-direction is not required to be a vertical direction, and an x-direction and a y-direction are not required to be horizontal directions.

For purposes herein, describing a first element as being mounted on a second element does not necessarily require that the first element be directly mounted on the second element. For example, if a probe is described as being mounted on a carriage, the probe may be directly mounted on a movable ram, which in turn is mounted on the carriage.

Having thus described several aspects of several embodiments of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of measuring the length of a workpiece feature with a coordinate measuring machine, the coordinate measuring machine comprising a table, first and second guideways associated with the table, a bridge movable in a y-direction, a drive element associated with the first guideway for driving the bridge, a carriage movable on the bridge in an x-direction, a probe mounted to the carriage, and a first scale operative to permit scale readings indicating x-direction positions of the carriage along the bridge, the method comprising:
   (A) obtaining hysteresis error data for the bridge;
   (B) moving the bridge in a first direction, moving the carriage in a second direction, and, at a first bridge position and a first carriage x-direction position, taking a first reading from the first scale;
   (C) moving the bridge in a third direction opposite to the first direction, moving the carriage in a fourth direction, and, at a second bridge position and a second carriage x-direction position, taking a second reading from the first scale; and
   (D) determining a value of the length of the workpiece feature based on at least: the first reading from the first scale; the second reading from the first scale; the first direction of movement of the bridge; and the hysteresis error data; and
   calculating the difference between the first reading from the first scale and the second reading from the first scale to determine an unadjusted value of the x-component measurement of the workpiece feature; and
   adjusting the unadjusted value of the x-component measurement of the workpiece feature to account for hysteresis error, wherein adjusting the unadjusted value comprises computing $2*(R_{yz}*Y_{z\text{-}rail\_offset}+Y_{probe\_offset})$, where $R_{yz}$ is the rotation of the bridge in radians, $Y_{probe\_offset}$ is a y-direction distance of the probe from a vertically-movable ram, and $Y_{z\text{-}rail\_offset}$ is a y-direction distance of the vertically-movable ram from a reference.

2. A method as in claim 1, wherein:
   the x-direction is perpendicular to the y-direction;
   at the first bridge position and the first carriage x-direction position, the first scale is rotated due to hysteresis within a plane formed by the x-direction and the y-direction;
   at the first bridge position and the first carriage x-direction position, the probe is spaced at a first y-component distance from the first scale; and
   (D) comprises determining a value of the length of the workpiece feature based on at least the first y-component distance of the probe from the first scale.

3. A method as in claim 2, wherein the scale is estimated to rotate about an axis which intersects the first scale and is perpendicular to the plane formed by the x-direction and the y-direction.

4. A method as in claim 2, wherein the scale is estimated to rotate about an axis which is perpendicular to the plane formed by the x-direction and the y-direction, and the axis is spaced by a y-component distance from the first scale; and
   (D) comprises determining a value of the length of the workpiece feature based on at least the y-component distance of the axis from the first scale.

5. A method as in claim 1, further comprising a second scale operative to permit scale readings indicating y-direction positions of the bridge along the first guideway, wherein (D) comprises determining the value of the length of the workpiece feature additionally based on at least scale readings from the second scale, and wherein no readings from any additional bridge scales are used to determine the value of the length of the workpiece feature.

6. A method as in claim 1, wherein (A) comprises:
   using the coordinate measuring machine to make a first calibration measurement of a calibration block dimension; and
   determining the difference between the first calibration measurement and the calibration block dimension.

7. A method as in claim 6, wherein (A) further comprises using the coordinate measuring machine to make a plurality of calibration measurements, including at least one calibration measurement for each of a plurality of calibration block dimensions; and
   determining an average difference between the calibration measurements and the calibration block dimensions.

8. A method as in claim 7, wherein each calibration block dimension is aligned such that the calibration block dimension is not parallel to the x-direction and not parallel to the y-direction.

9. A method as in claim 1, further comprising a second scale operative to permit scale readings indicating y-direction positions of the bridge along the first guideway, wherein the second guideway does not include a scale.

10. A method as in claim 1, wherein (A) comprises receiving data from previous calibration measurements.

11. A method as in claim 1, wherein (D) comprises determining the value of the length of the workpiece feature additionally based on at least the third direction of bridge movement.

12. A method as in claim 1, wherein (D) comprises adjusting the first scale reading to account for hysteresis error, and wherein adjusting the first scale reading comprises calculating an adjustment term $\epsilon_x$ using the equation:

$$\epsilon_x = R*(\text{Distance}_{probe}),$$

where R comprises the rotation in radians of the bridge in the plane formed by the x-direction and the y-direction, and $\text{Distance}_{probe}$ comprises the distance of the probe from the first scale.

13. A method as in claim 1, wherein (D) comprises adjusting the first scale reading to account for hysteresis error, and wherein adjusting the first scale reading comprises calculating an adjustment term $\epsilon_x$ using the equation:

$$\epsilon_x = R*(\text{Distance}_{probe}),$$

where R comprises the rotation in radians of the bridge in the plane formed by the x-direction and the y-direction, and $\text{Distance}_{probe}$ comprises the distance of the probe from a line that is parallel to the first scale and intersects the axis of rotation of the bridge.

14. A method as in claim 1, wherein the coordinate measuring machine is a gantry-type coordinate measuring machine, and further comprises a vertically-movable ram mounted to the carriage, the probe being mounted to the vertically-movable ram.

15. A method as in claim 1, wherein the coordinate measuring machine further comprises a vertically-movable ram mounted to the carriage, the probe being mounted to the vertically-movable ram, and wherein:
   (B) comprises moving the ram in a fifth direction to a first ram z-direction position, and wherein taking a first reading from the first scale comprises taking the first reading at the first bridge position, the first carriage position, and the first ram z-direction position;

(C) comprises moving the ram in a sixth direction to a second ram z-direction position, and wherein taking a second reading from the first scale comprises taking the second reading at the second bridge position, the second carriage position, and the second ram z-direction position; and (D) comprises determining a value of the length of the workpiece feature based additionally on at least the fifth direction of movement of the ram.

* * * * *